US007124245B1

(12) United States Patent
Walton et al.

(10) Patent No.: US 7,124,245 B1
(45) Date of Patent: Oct. 17, 2006

(54) DATA STORAGE SYSTEM HAVING CACHE MEMORY MANAGER WITH PACKET SWITCHING NETWORK

(75) Inventors: John K. Walton, Mendon, MA (US); William F. Baxter, III, Holliston, MA (US); Kendell A. Chilton, Southborough, MA (US); Daniel Castel, Boston, MA (US); Michael Bermingham, Framingham, MA (US); James M. Guyer, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/675,039

(22) Filed: Sep. 30, 2003

Related U.S. Application Data

(63) Continuation-in-part of application No. 10/180,751, filed on Jun. 26, 2002.

(51) Int. Cl.
*G06F 12/00* (2006.01)

(52) U.S. Cl. .......................................... 711/113; 711/4

(58) Field of Classification Search ................. 711/113
See application file for complete search history.

(56) References Cited

U.S. PATENT DOCUMENTS

| | | | | |
|---|---|---|---|---|
| 5,214,768 | A | 5/1993 | Martin | 395/425 |
| 5,903,911 | A | 5/1999 | Gaskins | 711/141 |

(Continued)

OTHER PUBLICATIONS

Microsoft Computer Dictionary, 2002, Microsoft Press, Fifth Edition, p. 334.*

(Continued)

*Primary Examiner*—Mano Padmanabhan
*Assistant Examiner*—Midys Rojas

(57) ABSTRACT

A system interface having: a plurality of front end directors adapted for coupling to a host computer/server; a plurality of back end directors adapted for coupling to a bank of disk drives; a data transfer section having cache memory; a cache memory manager; and, a message network. The cache memory is coupled to the plurality of front end and back end directors. The messaging network operates independently of the data transfer section and is coupled to the plurality of front end and back end. The front end and back end directors control data transfer between the host computer/server and the bank of disk drives in response to messages passing between the front end directors and the back end directors through the messaging network to facilitate data transfer between host computer/server and the bank of disk drives. The data passes through the cache memory in the data transfer section as such data passes between the host computer and the bank of disk drives. The system includes a cache memory manager having therein a memory for storing a map maintaining a relationship between data stored in the cache memory and data stored in the disk drives. The cache memory manager provides an interface between the host computer, the bank of disk drives and the cache memory for determining for the directors whether data to be read from the disk drives, or data to be written to the disk drives, resides in the cache memory. With such an arrangement, the cache memory in the data transfer section is not burdened with the task of transferring the director messaging but rather a messaging network is provided, operative independent of the data transfer section, for such messaging thereby increasing the operating bandwidth of the system interface. Further, the cache memory is no longer burdened with the task of evaluating whether data to be read from the disk drives, or data to be written to the disk drives, resides in the cache memory. The cache memory manager, plurality of front end directors, plurality of back end directors and cache memory are interconnected through a packet switching network.

6 Claims, 29 Drawing Sheets

U.S. PATENT DOCUMENTS

| | | | | |
|---|---|---|---|---|
| 5,920,893 | A | 7/1999 | Nakayama et al. | 711/147 |
| 6,009,481 | A * | 12/1999 | Mayer | 710/33 |
| 6,216,199 | B1 | 4/2001 | DeKoning et al. | |
| 6,606,715 | B1 | 8/2003 | Kikuchi | 714/714 |
| 6,611,879 | B1 * | 8/2003 | Dobecki | 710/1 |
| 6,651,130 | B1 * | 11/2003 | Thibault | 710/317 |
| 2002/0184441 | A1 | 12/2002 | Wong et al. | |
| 2003/0009643 | A1 * | 1/2003 | Arimilli et al. | 711/155 |
| 2003/0135674 | A1 * | 7/2003 | Mason et al. | 710/74 |
| 2004/0010659 | A1 | 1/2004 | Inoue | |

OTHER PUBLICATIONS

U.S. Appl. No. 10/180,751, filed Jun. 26, 2002.

* cited by examiner

| ADDRESS TO MAP | INFORMATION STORED IN MAP AT THE MAP ADDRESS | | | |
|---|---|---|---|---|
| | | MISC. CONTROL | | |
| CACHE MEMORY SLOT | DISK ADDRESS/'HIT' or 'MISS' | FLAGS | TIME WRITTEN | LRU POINTERS |
| Cache Memory Slot 1 | IN DISK DRIVE AT ADDRESS D (A 'MISS') | | | |
| Cache Memory Slot 2 | IN CACHE (A 'HIT') | | | |
| Cache Memory Slot 3 | IN DISK DRIVE AT ADDRESS D (A 'MISS') | | | |
| ⋮ | ⋮ | ⋮ | ⋮ | ⋮ |
| Cache Memory Slot n | IN DISK DRIVE AT ADDRESS D (A 'MISS') | | | |

*FIG. 5*

| HASHED ADDRESS TO MAP | INFORMATION STORED IN MAP AT THE MAP ADDRESS |
|---|---|
| CACHE MEMORY SLOT | |
| Cache Memory Slot 1 | |
| Cache Memory Slot 2 | |
| Cache Memory Slot 3 | |
| ⋮ | ⋮ |
| Cache Memory Slot $n_1$ | |

| HASHED ADDRESS TO MAP | INFORMATION STORED IN MAP AT THE MAP ADDRESS |
|---|---|
| CACHE MEMORY SLOT | |
| Cache Memory Slot 1 | |
| Cache Memory Slot 2 | |
| Cache Memory Slot 3 | |
| ⋮ | ⋮ |
| Cache Memory Slot $n_2$ | |

— · —

| HASHED ADDRESS TO MAP | INFORMATION STORED IN MAP AT THE MAP ADDRESS |
|---|---|
| CACHE MEMORY SLOT | |
| Cache Memory Slot 1 | |
| Cache Memory Slot 2 | |
| Cache Memory Slot 3 | |
| ⋮ | ⋮ |
| Cache Memory Slot $n_3$ | |

*FIG. 5A*

| COMMAND | DESTINATION ID | SOURCE ID | ADDRESS | PAYLOAD | CRC |
|---|---|---|---|---|---|

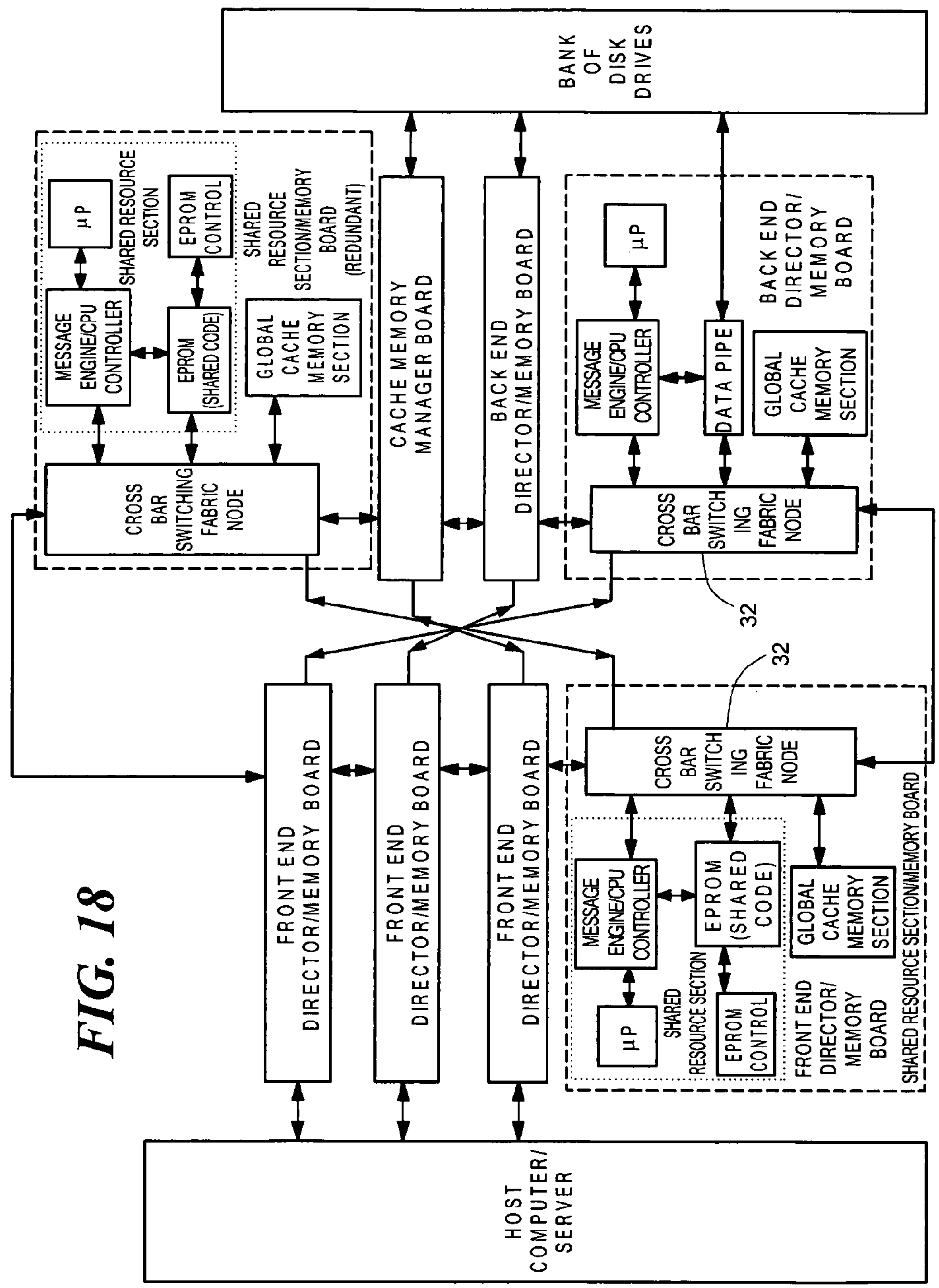
FIG. 18
BANK OF DISK DRIVES
HOST COMPUTER/ SERVER
FRONT END DIRECTOR/MEMORY BOARD
FRONT END DIRECTOR/MEMORY BOARD
FRONT END DIRECTOR/MEMORY BOARD
CACHE MEMORY MANAGER BOARD
BACK END DIRECTOR/MEMORY BOARD
CROSS BAR SWITCHING FABRIC NODE
MESSAGE ENGINE/CPU CONTROLLER
μP
EPROM (SHARED CODE)
EPROM CONTROL
GLOBAL CACHE MEMORY SECTION
SHARED RESOURCE SECTION
SHARED RESOURCE SECTION/MEMORY BOARD (REDUNDANT)
DATA PIPE
BACK END DIRECTOR/ MEMORY BOARD
FRONT END DIRECTOR/ MEMORY BOARD
SHARED RESOURCE SECTION/MEMORY BOARD
32
32

Translation Table Format

Address — Data f(x)

| Remote CPU Number | Remote Producer Index | Remote Consumer Index | Misc. Remote Info |
|---|---|---|---|
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |

DATA STORAGE SYSTEM HAVING CACHE MEMORY MANAGER WITH PACKET SWITCHING NETWORK

RELATED CASES

This is a continuation in part of copending patent application Ser. No. 10/180,751, filed Jun. 26, 2002, entitled "Data Storage System Having Cache Memory Manager" inventor Kendell A. Chilton.

INCORPORATIONS BY REFERENCE

This application incorporates by reference, in their entirety, the following co-pending patent applications all assigned to the same assignee as the present invention:

| INVENTORS | FILING DATE | SERIAL NO. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton- | May 17, 2001 | 09/859,659 | Data Storage System Having No-Operation Command |

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive.

One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board. In order to provide data integrity in case of a failure in a director, the backplane printed circuit board has a pair of buses. One set the disk directors is connected to one bus and another set of the disk directors is connected to the other bus. Likewise, one set the host computer/server directors is connected to one bus and another set of the host computer/server directors is directors connected to the other bus. The cache memories are connected to both buses. Each one of the buses provides data, address and control information.

The arrangement is shown schematically in FIG. 1. Thus, the use of two buses B1, B2 provides a degree of redundancy to protect against a total system failure in the event that the controllers or disk drives connected to one bus, fail. Further, the use of two buses increases the data transfer bandwidth of the system compared to a system having a single bus. Thus, in operation, when the host computer/server 12 wishes to store data, the host computer 12 issues a write request to one of the front-end directors 14 (i.e., host computer/server directors) to perform a write command. One of the front-end directors 14 replies to the request and asks the host computer 12 for the data. After the request has passed to the requesting one of the front-end directors 14, the director 14 determines the size of the data and reserves space in the cache memory 18 to store the request. The front-end director 14 then produces control signals on one of the address memory busses B1, B2 connected to such front-end director 14 to enable the transfer to the cache memory 18. The host computer/server 12 then transfers the data to the front-end director 14. The front-end director 14 then advises the host computer/server 12 that the transfer is complete. The front-end director 14 looks up in a Table, not shown, stored in the cache memory 18 to determine which one of the back-end directors 20 (i.e., disk directors) is to handle this request. The Table maps the host computer/server 12 addresses into an address in the bank 14 of disk drives. The front-end director 14 then puts a notification in a "mail box" (not shown and stored in the cache memory 18) for the back-end director 20, which is to handle the request, the amount of the data and the disk address for the data. Other back-end directors 20 poll the cache memory 18 when they are idle to check their "mail boxes". If the polled "mail box" indicates a transfer is to be made, the back-end director 20 processes the request, addresses the disk drive in the bank 22, reads the data from the cache memory 18 and writes it into the addresses of a disk drive in the bank 22.

When data is to be read from a disk drive in bank 22 to the host computer/server 12 the system operates in a reciprocal manner. More particularly, during a read operation, a read request is instituted by the host computer/server 12 for data at specified memory locations (i.e., a requested data block). One of the front-end directors 14 receives the read request and examines the cache memory 18 to determine whether the requested data block is stored in the cache memory 18. If the requested data block is in the cache memory 18, the requested data block is read from the cache memory 18 and is sent to the host computer/server 12. If the front-end director 14 determines that the requested data block is not in the cache memory 18 (i.e., a so-called "cache miss") and the director 14 writes a note in the cache memory 18 (i.e., the "mail box") that it needs to receive the requested data block. The back-end directors 20 poll the cache memory 18 to determine whether there is an action to be taken (i.e., a read operation of the requested block of data). The one of the back-end directors 20 which poll the cache memory 18 mail box and detects a read operation reads the requested data block and initiates storage of such requested data block stored in the cache memory 18. When the storage is completely written into the cache memory 18, a read complete indication is placed in the "mail box" in the cache memory 18. It is to be noted that the front-end directors 14 are polling the cache memory 18 for read complete indications. When one of the polling front-end directors 14 detects a read complete indication, such front-end director 14 completes the transfer of the requested data which is now stored in the cache memory 18 to the host computer/server 12.

The use of mailboxes and polling requires time to transfer data between the host computer/server 12 and the bank 22 of disk drives thus reducing the operating bandwidth of the interface.

SUMMARY OF THE INVENTION

In accordance with the present invention, a system interface is provided having: a plurality of front end directors adapted for coupling to a host computer/server; a plurality of back end directors adapted for coupling to a bank of disk drives; a data transfer section having a cache memory; and a cache memory manager. The cache memory is coupled to the plurality of front end and back end directors. The front end and back end directors control data transfer between the host computer/server and the bank of disk drives. The data passes through the cache memory in the data transfer section as such data passes between the host computer and the bank of disk drives. The cache memory manager has therein a memory for storing a map maintaining a relationship between data stored in the cache memory and data stored in the disk drives. The cache memory manager provides an interface between the host computer, the bank of disk drives, and the cache memory for determining for the directors whether data to be read from the disk drives, or data to be written to the disk drives, resides in the cache memory. The cache memory manager, plurality of front end directors, plurality of back end directors and cache memory are interconnected through a packet switching network With such an arrangement, the cache memory is no longer burdened with the task of evaluating whether data to be read from the disk drives, or data to be written to the disk drives, resides in the cache memory.

In one embodiment, the cache memory manager is disposed in at least one of the back end directors.

In one embodiment, the memory in the cache memory manager has a plurality of, n, locations, each one of the locations corresponding to a location in the disk drives. Each one of the locations in the memory in the cache memory manager is adapted to store therein a disk address and an indication as to whether data stored or to be stored in such disk location is in the cache memory. Thus, each one of the locations in the memory in the cache memory manager corresponds to a disk drive location and provides an indication as to whether data at a host computer/server provided disk drive address is in the disk drive (i.e., a cache memory "miss") or in the cache memory (i.e., a cache memory "hit").

In one embodiment, the logical disk address provided by the host computer/server is hashed and the memory in the cache memory manager comprises a plurality of, m, tables. Each one of such m tables has a plurality, $n_m$, locations where the sum of the locations of the m tables equals n.

In one embodiment, in response to a query of the memory in the cache memory manager as to whether data stored or to be stored in such disk location is in the cache memory, an the logical disk address provided by the host computer/server is hashed and such hashed address is fed to address one of the m tables in the cache memory manager.

In one embodiment, the system interface includes a message network. The messaging network operates independently of the data transfer section and is coupled to the plurality of front end and back end directors. The front end and back end directors control data transfer between the host computer/server and the bank of disk drives in response to messages passing between the front end directors and the back end directors through the messaging network to facilitate data transfer between the host computer and the bank of disk drives. The data passes through the cache memory in the data transfer section as such data passes between the host computer and the bank of disk drives.

With such an arrangement, the cache memory in the data transfer section is not burdened with the task of transferring the director messaging but rather a messaging network is provided, operative independent of the data transfer section, for such messaging thereby increasing the operating bandwidth of the system interface.

BRIEF DESCRIPTION OF THE DRAWINGS

These and other features of the invention will become more readily apparent from the following detailed description when read together with the accompanying drawings, in which:

FIG. 5 is a diagram showing data stored in a cache memory management table stored in a cache manager used in the system of FIG. 2 in accordance with the invention;

FIG. 5A is a diagram showing data stored in a cache memory management table stored in a cache manager used in the system of FIG. 2 when such table is hashed into a plurality of tables;

FIG. 18 is a more detailed block diagram of a director used in the system of FIG. 8;

FIG. 23 is a diagram of a translation table used in the flow diagrams of FIGS. 20 and 21.

The details of one or more embodiments of the invention are set forth in the accompanying drawings and the description below. Other features, objects, and advantages of the invention will be apparent from the description and drawings, and from the claims.

Like reference symbols in the various drawings indicate like elements.

DETAILED DESCRIPTION

Figure 1:
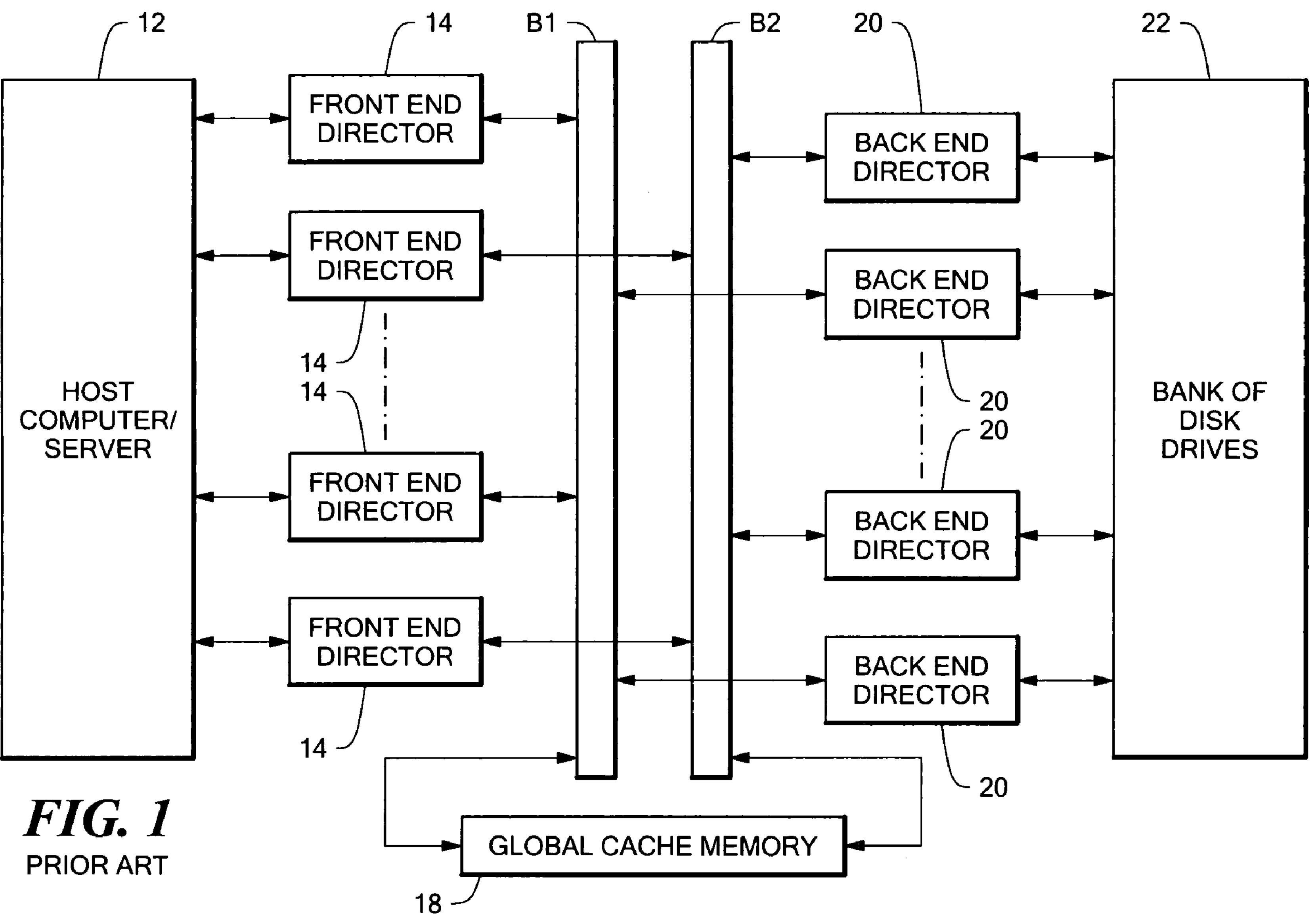
FIG. 1 is a block diagram of a data storage system according to the PRIOR ART.
Figure 2:
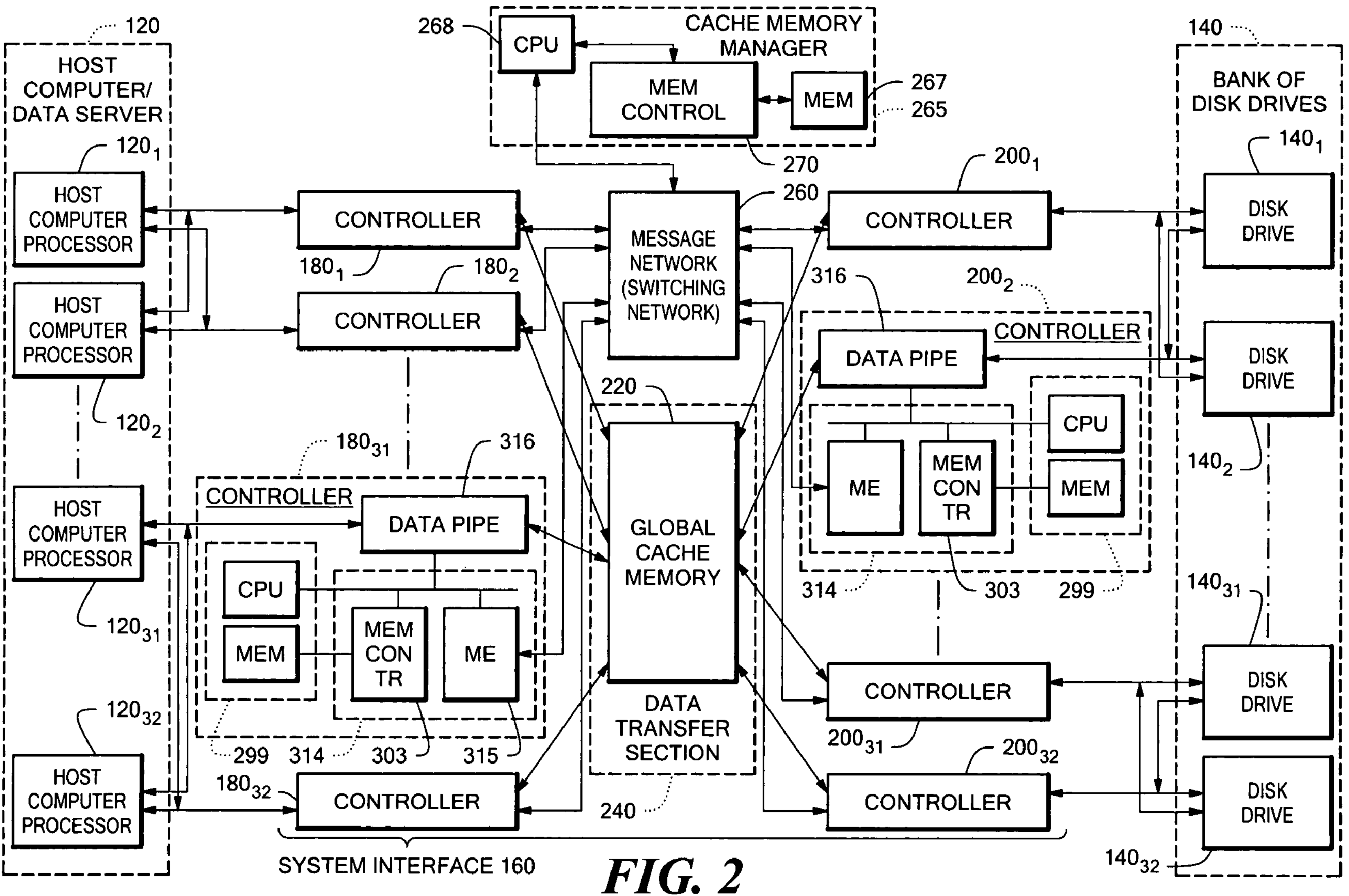
FIG. 2 is a block diagram of a data storage system according to the invention.

Referring now to FIG. 2, a data storage system 100 is shown for transferring data between a host computer/server 120 and a bank of disk drives 140 through a system interface 160. The system interface 160 includes: a plurality of, here 32 front-end directors $\mathbf{180}_1$–$\mathbf{180}_{32}$ coupled to the host computer/server 120; a plurality of back-end directors $\mathbf{200}_1$–$\mathbf{200}_{32}$ coupled to the bank of disk drives 140; a data transfer section 240, having a global cache memory 220, coupled to the plurality of front-end directors $\mathbf{180}_1$–$\mathbf{180}_{16}$ and the back-end directors $\mathbf{200}_1$–$\mathbf{200}_{16}$; a messaging network 260, operative independently of the data transfer section 240, coupled to the plurality of front-end directors $\mathbf{180}_1$–$\mathbf{180}_{32}$ and the plurality of back-end directors $\mathbf{200}_1$–$\mathbf{200}_{32}$, as shown; and, a cache memory manager 265.

It is noted that in the host computer 120, each one of the host computer processors $\mathbf{121}_1$–$\mathbf{121}_{32}$ is coupled to here a pair (but not limited to a pair) of the front-end directors $\mathbf{180}_1$–$\mathbf{180}_{32}$, to provide redundancy in the event of a failure in one of the front end-directors $\mathbf{181}_1$–$\mathbf{181}_{32}$ coupled thereto. Likewise, the bank of disk drives 140 has a plurality of, here 32, disk drives $\mathbf{141}_1$–$\mathbf{141}_{32}$, each disk drive $\mathbf{141}_1$–$\mathbf{141}_{32}$ being coupled to here a pair (but not limited to a pair) of the back-end directors $\mathbf{200}_1$–$\mathbf{200}_{32}$, to provide redundancy in the event of a failure in one of the back-end directors $\mathbf{200}_1$–$\mathbf{200}_{32}$ coupled thereto.

The front-end and back-end directors $\mathbf{180}_1$–$\mathbf{180}_{32}$, $\mathbf{200}_1$–$\mathbf{200}_{32}$ are functionally similar and include a microprocessor (μP) 299 (i.e., a central processing unit (CPU) and RAM), a message engine/CPU controller 314 having a message engine 315 and a memory controller 303; and, a data pipe 316, arranged as shown and described in more detail in co-pending patent application Ser. No. 09/540,828 filed Mar. 31, 2000, inventor Yuval Ofek et al., assigned to the same assignee as the present invention, the entire subject matter thereof being incorporated by reference. Suffice it to say here, however, that the front-end and back-end directors $\mathbf{180}_1$–$\mathbf{180}_{32}$, $\mathbf{200}_1$–$\mathbf{200}_{32}$ control data transfer between the host computer/server 120 and the bank of disk drives 140 in response to messages passing between the directors $\mathbf{180}_1$–$\mathbf{180}_{32}$, $\mathbf{200}_1$–$\mathbf{200}_{32}$ through the messaging network 260, basically a switching network as described in the above reference co-pending patent application. The messages facilitate the data transfer between host computer/server 120 and the bank of disk drives 140 with such data passing through the global cache memory 220 via the data transfer section 240. More particularly, in the case of the front-end directors $\mathbf{180}_1$–$\mathbf{180}_{32}$, the data passes between the host computer 102 to the global cache memory 220 through the data pipe 316 in the front-end directors $\mathbf{180}_1$–$\mathbf{180}_{32}$ and the messages pass through the message engine/CPU controller 314 in such front-end directors $\mathbf{180}_1$–$\mathbf{180}_{32}$. In the case of the back-end directors $\mathbf{200}_1$–$\mathbf{200}_{32}$ the data passes between the back-end directors $\mathbf{200}_1$–$\mathbf{200}_{32}$ and the bank of disk drives 140 and the global cache memory 220 through the data pipe 316 in the back-end directors $\mathbf{200}_1$–$\mathbf{200}_{32}$ and again the messages pass through the message engine/CPU controller 314 in such back-end director $\mathbf{200}_1$–$\mathbf{200}_{32}$.

The cache memory manager 265 includes therein a memory 267 for storing a map maintaining a relationship between data stored in the cache memory 220 and data stored in the bank of disk drives 240. The cache memory manager 265 also includes a CPU coupled to the message network 260 and a memory controller 270 coupled between the CPU 268 and the memory 267, as shown. Further detail of the cache memory manager 265 and the message network 260 are provided herein in connection with FIG. 6. Suffice it to say here, however, that the cache memory manager 265 provides an interface between the host computer 102, the bank of disk drives 104, and the cache memory 220 via the message network 260 for determining for the front end directors $180_1$–$180_{32}$ and back-end directors $200_1$–$200_{32}$ whether data to be read from the bank of disk drives 104, or data to be written to the bank of disk drives 104, resides in the cache memory 220. The memory controller 270 contains hardware to assist in the management functions, including Content Addressable functions, to search the lists; and Indirect Addressing capability, to work linked lists and queues.

With such cache memory manager 265, the cache memory 220 in the data transfer section is not burdened with the task of transferring the director messaging but rather a messaging network is provided, operative independent of the data transfer section, for such messaging thereby increasing the operating bandwidth of the system interface. Further, the cache memory 220 is no longer burdened with the task of evaluating whether data to be read from the disk drives, or data to be written to the disk drives, resides in the cache memory.

Still further, by providing tables (or maps) to be described in the memory 267 of the cache memory manager 265 rather than in the cache memory 220 yields a speed of access to the memory 267 which is much higher than the shared cache memory 220.

Further, with the messing network 260, the cache memory 220 in the data transfer section 240 is not burdened with the task of transferring the director messaging. Rather, the messaging network 260 operates independent of the data transfer section 240 thereby increasing the operating bandwidth of the system interface 160.

Figure 3A:
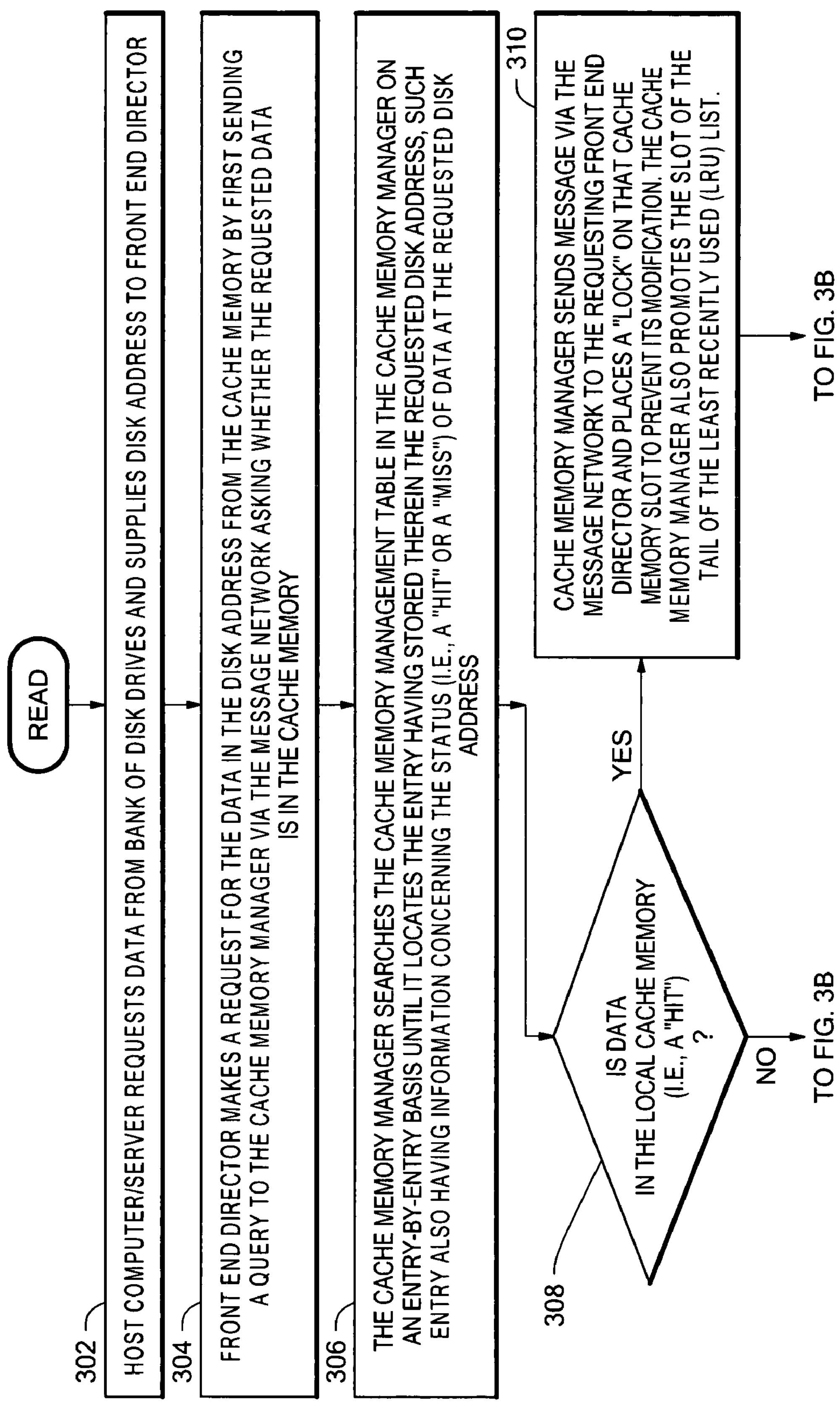
FIG. 3 is a flow diagram of the process used to read data from a disk drive used in the system of FIG. 2.
Figure 3B:
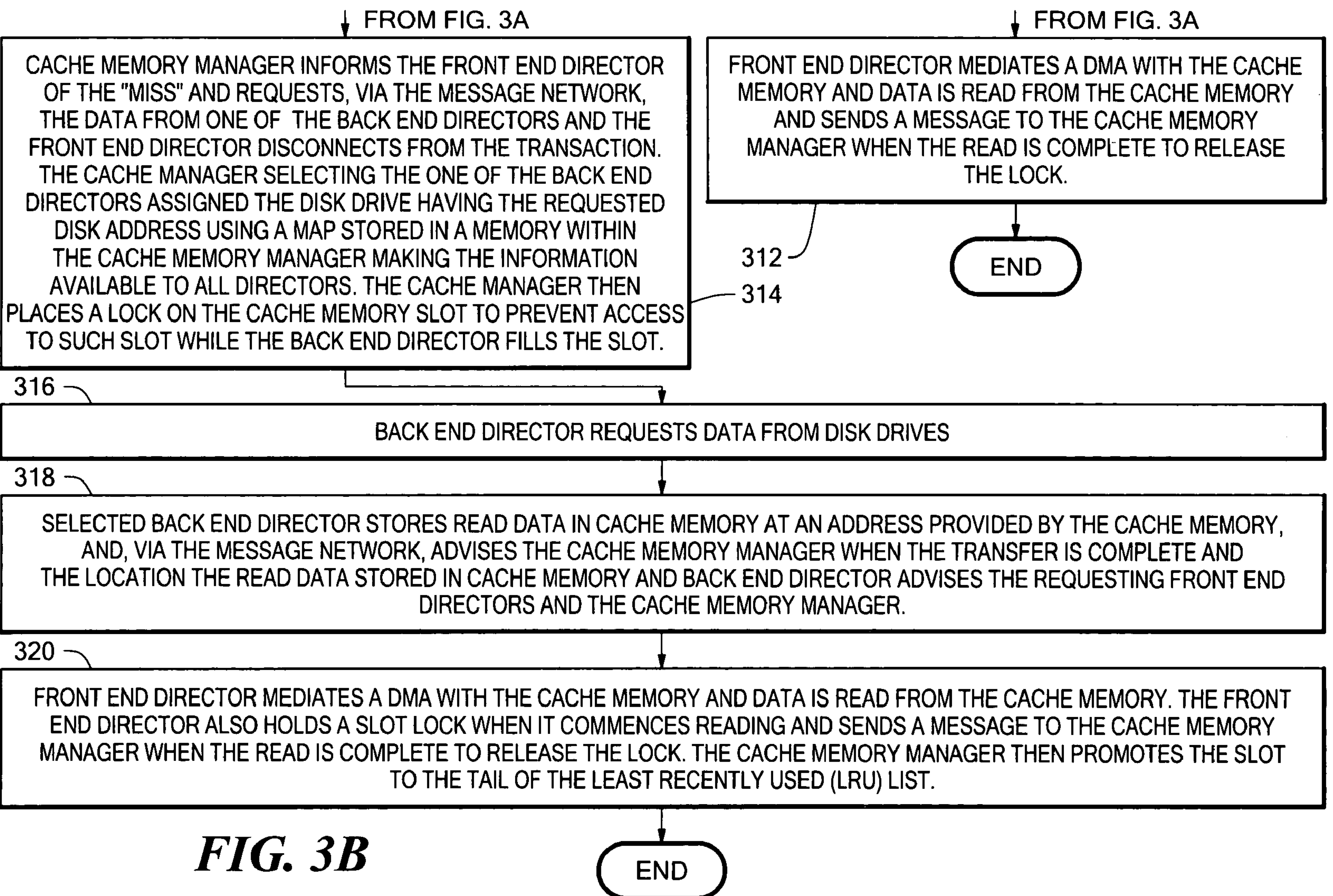

In operation, and considering first a read operation, reference is made also to FIG. 3. In Step 302, the host computer/server 120 requests data from the bank of disk drives 140 and supplies the disk address to the front end director. The request is passed from one of the plurality of, here 32, host computer processors $121_1$–$121_{32}$ in the host computer 120 to one or more of the pair of the front-end directors $180_1$–$180_{32}$ connected to such host computer processor $121_1$–$121_{32}$. As noted above, each one of the front-end directors $180_1$–$180_{32}$ includes a microprocessor (μP) 299 (i.e., a central processing unit (CPU) and RAM). The microprocessor 299 makes a request for the data from the global cache memory 220. The read request is passed to the cache memory manager 265 through the message network 260.

More particularly, the front end director makes a request for the data in the disk address from the cache memory 220 by first sending a query to the cache memory manager 265 via the message network 260 asking whether the requested data is in the cache memory 220 (Step 304). The cache memory manager 365 includes the memory 267 described above, which stores a resident cache management table, to be described in connection with FIGS. 5 and 5A. Suffice it to say here, however, that the memory 267 in the cache memory manager 265 stores a map maintaining a relationship between data stored in the cache memory 220 and data stored in the bank of disk drives 140. Thus, the cache memory manager 265 provides an interface between the host computer 120, the bank of disk drives 140, and the cache memory 220 for determining for the front end and back end directors whether data to be read from the disk drives, or data to be written to the disk drives, resides in the cache memory 220. With such an arrangement, the cache memory 220 is no longer burdened with the task of evaluating whether data to be read from the disk drives 140, or data to be written to the disk drives 140, resides in the cache memory 220.

More particularly, every director $180_1$–$180_{32}$, $200_1$–$200_{32}$ has access to the cache memory manager 265 through the message network 260. Every time the host computer/server 120 requests a data transfer, the front-end director $180_1$–$180_{32}$ must query the cache memory manager 265 to determine whether the requested data is in the global cache memory 220. If the requested data is in the global cache memory 220 (i.e., a read “hit”), cache memory manager 265 examines the memory 267 therein and returns the location of the data in the cache memory 220 to the front-end director $180_1$–$180_{32}$, more particularly the microprocessor 299 therein, which mediates a DMA (Direct Memory Access) operation for the global cache memory 220 and the requested data is transferred to the requesting host computer processor $121_1$–$121_{32}$.

Thus, referring to Step 306, the cache memory manager 265 searches the cache memory management table stored in memory 267 in the cache memory manager on an entry-by-entry basis until it locates the entry having stored therein the requested disk drive. This entry also has information concerning the status (i.e., a cache “hit” or a cache “miss”) of the data at the requested disk address. If, in Step 308, there is a cache “hit”, the cache memory manager 265 sends a message via the message network 280 to the requested front end director, Step 310. Also, in Step 310, the cache memory manager 265 places a “lock” on that cache memory address (i.e., slot) to prevent its modification. The cache memory manager 265 also promotes the slot to the tail, or end, of the Least Recently Used (LRU) list.

In Step 312, the front end director, in response to such sent message, mediates a DMA from the cache memory 220. When the read is complete the front end director sends a message to the cache memory manager 265 to release the “lock”.

If, on the other hand, in Step 308, the cache memory manager 265 examines the memory 265 therein (Step 306) and determines that the requested data is not in the global cache memory 220 (i.e., a “miss”), as a result of the query of the cache management table 267 in the cache manger 265, such front-end director $180_1$–$180_{32}$ is advised by the cache memory manager 265 that the requested data is in the bank of disk drives 140. Thus, the cache memory manager 265 informs the front-end director $180_1$–$180_{32}$ of the “miss” and requests via the message network 260, the data from one of the back-end directors $200_1$–$200_{32}$ in order for such back-end director $200_1$–$200_{32}$ to request the data from the bank of disk drives 140 and the front end director disconnects from the transaction (Step 314). Also, the cache memory manager 265 selects the one of the back end directors assigned the disk drive having the requested disk address using a map stored in memory 267 of the cache memory manager 265 making the information available to all directors. The cache memory manager then places a “lock” on the cache memory 220 slot to prevent access while the back end director fills the slot.

The mapping of which back-end directors $200_1$–$200_{32}$ control which disk drives $141_1$–$141_{32}$ in the bank of disk drives 140 is determined during a power-up initialization phase. The back end director/disk drive map is stored in the memory 267 of the cache memory manager memory 265 and is available to all front and back end directors. Thus, when the front-end director $180_1$–$180_{32}$ makes a request for data from the global cache memory 220 and determines that the requested data is not in the global cache memory 220 (i.e., a "miss"), the cache memory manager 265 determines which of the back-end directors $\mathbf{200}_1$–$\mathbf{200}_{32}$ is responsible for the requested data in the bank of disk drives 140. This request between the cache memory manager 285 and the appropriate one of the back-end directors $\mathbf{200}_1$–$\mathbf{200}_{32}$ (as determined by the back end director/disk drive map) is by a message which passes from the cache memory manager 265 through the message network 260 to the appropriate back-end director $\mathbf{200}_1$–$\mathbf{200}_{32}$. It is noted then that the message does not pass through the global cache memory 220 (i.e., does not pass through the data transfer section 240) but rather passes through the separate, independent message network 260. Thus, communication between the directors cache memory manager 265 is through the message network 260 and not through the global cache memory 220. Consequently, valuable bandwidth for the global cache memory 220 is not used for messaging among the directors $\mathbf{180}_1$–$\mathbf{180}_{32}$, $\mathbf{200}_1$–$\mathbf{200}_{32}$. Thus, cache memory bandwidth is not used to evaluate cache memory status.

In Step 316, the back end director requests data from the bank of disk drives 140.

Thus, on a global cache memory 220 "read miss", the cache memory manager 265 send a message to the appropriate one of the back-end directors $\mathbf{200}_1$–$\mathbf{200}_{32}$ through the message network 260 to instruct such back-end director $\mathbf{200}_1$–$\mathbf{200}_{32}$ to transfer the requested data from the bank of disk drives 140 to the global cache memory 220 and where in the cache memory 220 to store the data. More particularly, in Step 318, the selected back end director stores read data in the cache memory 220 at an address provided by the cache memory manager 265 and, via the message network 2660, advises the cache memory manager 265 when the transfer is complete along with the location the read data is stored in the cache memory 220. The back end director also advises the front end director requesting the data and the cache memory manager of this information.

When accomplished, the back-end director $\mathbf{200}_1$–$\mathbf{200}_{32}$ advises the requesting cache memory manager 265 that the transfer is accomplished by a message which passes from the back-end director $\mathbf{200}_1$–$\mathbf{200}_{32}$ to the cache memory manager 265 through the message network 260. In response to the acknowledgement signal, the cache memory manager 265 advises that the requesting front-end director $\mathbf{180}_1$–$\mathbf{180}_{32}$ can transfer the data from the global cache memory 220 to the requesting host computer processor $\mathbf{121}_1$–$\mathbf{121}_{32}$ as described above when there is a cache "read hit".

More particularly, in Step 320, the front end director, in response to such sent message, mediates a DMA from the cache memory 220 and such front end director is granted a lock on the cache memory 220 when the cache memory manager 265 returns a pointer to the data and such front end director then commences reading the data from the cache memory 220. When the read is complete the front end director sends a message to the cache memory manager 265 to release the lock.

It should be noted that there might be one or more back-end directors $\mathbf{200}_1$–$\mathbf{200}_{32}$ responsible for the requested data. Thus, if only one back-end director $\mathbf{200}_1$–$\mathbf{200}_{32}$ is responsible for the requested data, the requesting cache memory manager sends a uni-cast message via the message network 260 to only that specific one of the back-end directors $\mathbf{200}_1$–$\mathbf{200}_{32}$. On the other hand, if more than one of the back-end directors $\mathbf{200}_1$–$\mathbf{200}_{32}$ is responsible for the requested data, a multi-cast message (here implemented as a series of uni-cast messages) is sent by the cache memory manager 265 to all of the back-end directors $\mathbf{200}_1$–$\mathbf{200}_{32}$ having responsibility for the requested data. In any event, with both a uni-cast or multi-cast message, such message is passed through the message network 260 and not through the data transfer section 240 (i.e., not through the global cache memory 220).

Likewise, it should be noted that while one of the host computer processors $\mathbf{121}_1$–$\mathbf{121}_{32}$ might request data, the acknowledgement signal may be sent to the requesting host computer processor $\mathbf{121}_1$ or one or more other host computer processors $\mathbf{121}_1$–$\mathbf{121}_{32}$ via a multi-cast (i.e., sequence of uni-cast) messages through the message network 260 to complete the data read operation.

Figure 4A:
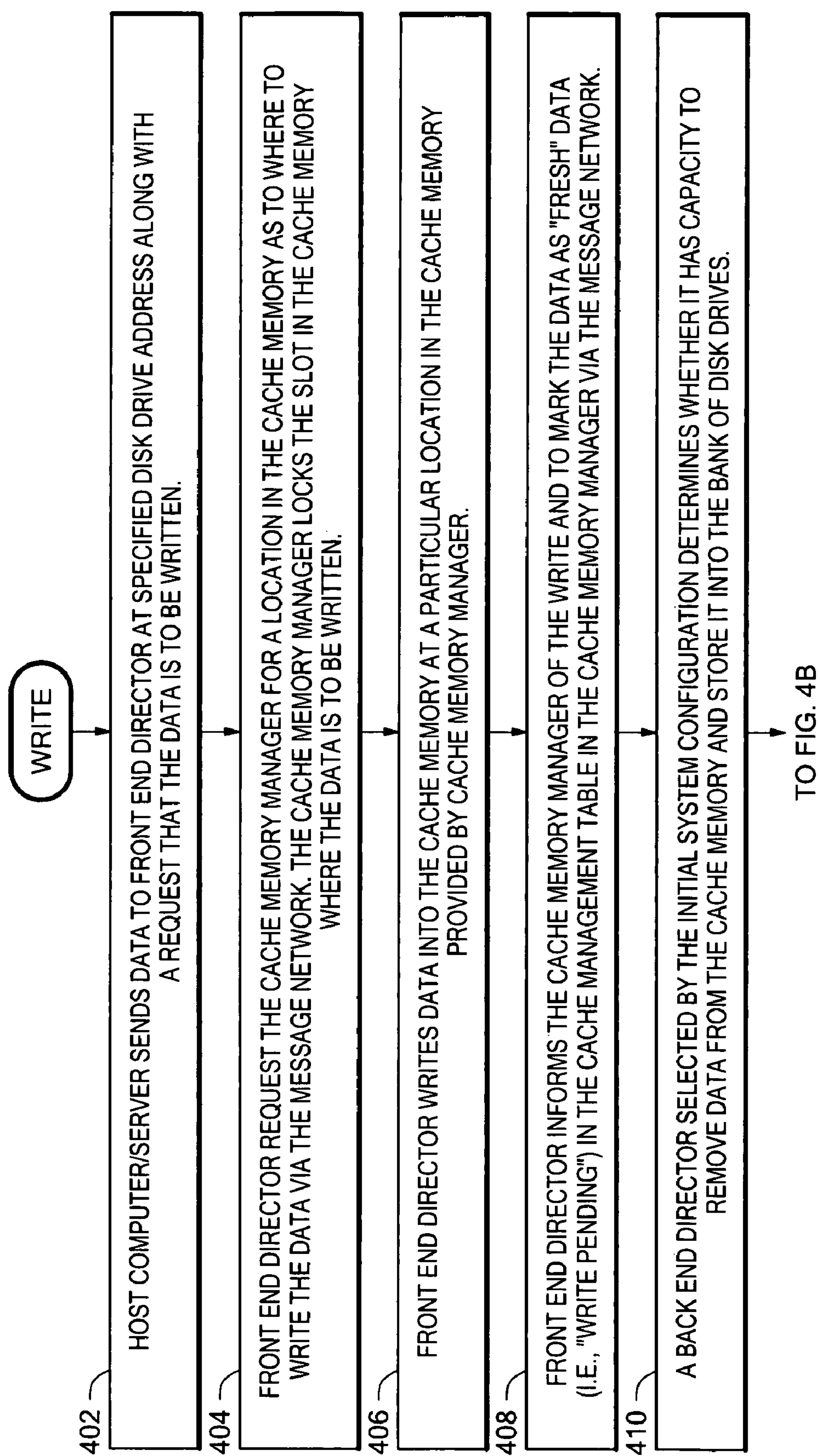
FIG. 4 is a flow diagram of the process used to write data from into the disk drive used in the system of FIG. 2.
Figure 4B:
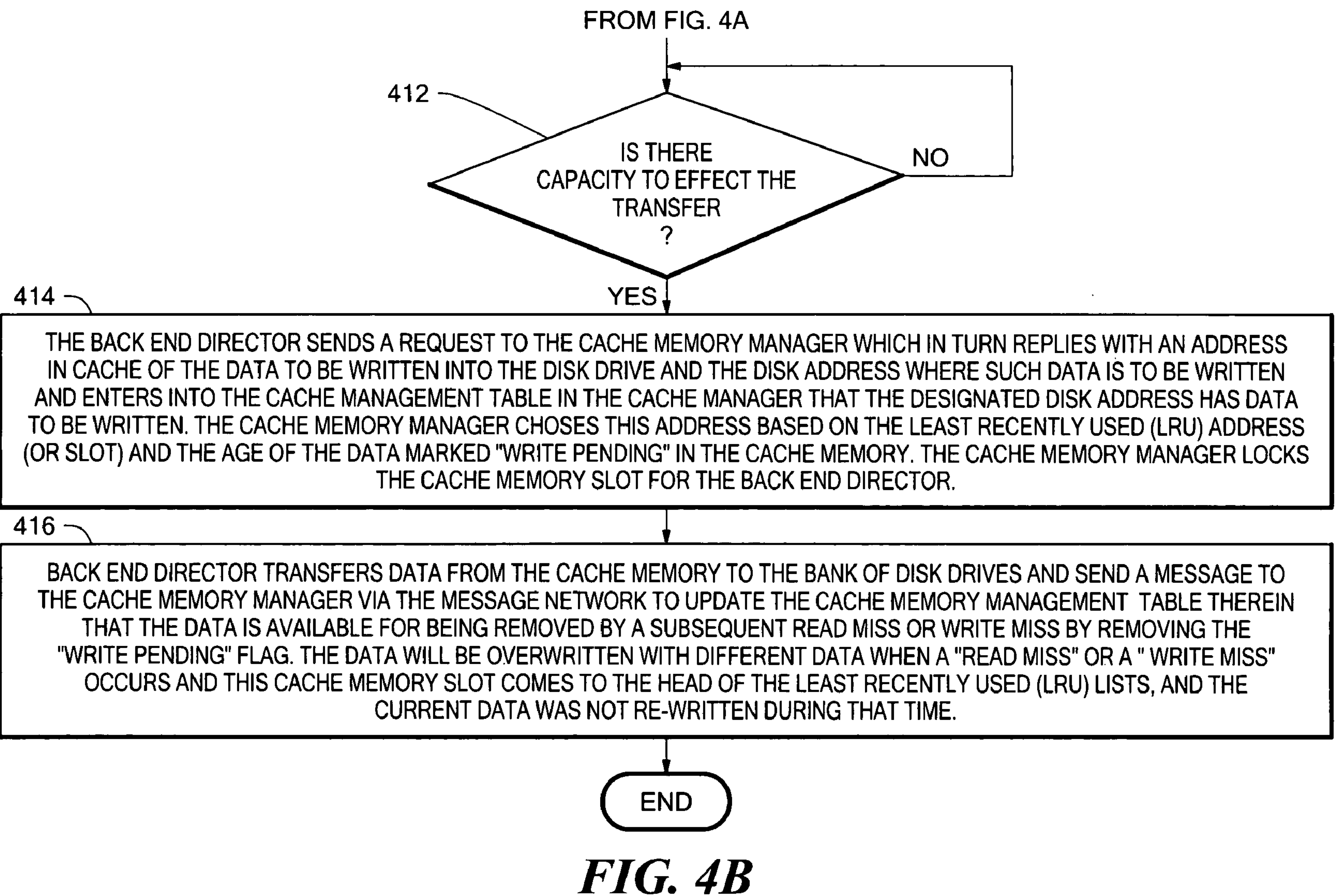

Considering a write operation, and referring to FIG. 4, the host computer 120 wishes to write data into storage (i.e., into the bank of disk drives 140). Thus, in Step 402, the host computer/server 120, sends data to be written into the disk drives 140 to a front end director along with a request that the data is to be written at a specified disk drive address. One of the front-end directors $\mathbf{180}_1$–$\mathbf{180}_{32}$ receives the data from the host computer 120 and writes it into the global cache memory 220. More particularly, in Step 404, the front end director requests the cache memory manager 265, via the message network 260, for a location in the cache memory 220 as to where to write the data. The cache memory manager 265 locks the slot in the cache memory 220 where the data is to be written. In Step 406, the front end director writes the data into the cache memory 220 at the particular address provided by the cache memory manager 265.

After informing the cache memory manager 265 of the write, the front end director $\mathbf{180}_1$–$\mathbf{180}_{32}$ then, after completing the write, sends a message to the cache memory manager 265 to mark the data as "fresh data" (i.e., "write pending"). More particularly, in Step 408, the front end director informs the cache memory manager 265 of the write to mark the data as "fresh" data (i.e., "write pending") in the cache memory table 267.

After some period of time, the back-end director $\mathbf{200}_1$–$\mathbf{200}_{32}$ determines whether or not it has the capacity to remove data from the cache memory 220 and store it in the bank of disk drives 140 (Step 410).

If there is no capacity, the back end director waits until there is capacity (Step 412).

When there is capacity (Step 412), the back-end director $\mathbf{200}_1$–$\mathbf{200}_{32}$ sends a request to the cache memory manager 265 which in turn replies with the address in the cache memory 220 of the data to be de-staged (i.e., read therefrom) and to which one of the disk drives is to store such de-staged data (i.e., a specified disk drive address where such data is to be written). The cache memory manager selects this address based on the Least Recently Used (LRU) list and the age of the data marked "write pending" in the cache memory 220. The cache memory manager 265 "locks" the cache memory slot for the back end director (Step 414).

As noted, before the transfer to the bank of disk drives 140, the data in the cache memory 220 is tagged, as noted in Step 408, with a bit as "fresh data" (i.e., data which has not been transferred to the bank of disk drives 140, that is data which is "write pending"). Thus, if there are multiple write requests for the same memory location in the global cache memory 220 (e.g., a particular bank account) before being transferred to the bank of disk drives 140, the data is overwritten in the cache memory 220 with the most recent data. Each time data is transferred to the global cache memory 220, the front-end director $\mathbf{180}_1$–$\mathbf{180}_{32}$ controlling the transfer also informs the host computer 120 that the transfer is complete to thereby free-up the host computer 120 for other data transfers.

When it is time to transfer the data in the global cache memory 220 to the bank of disk drives 140, the back-end director 200$_1$–200$_{32}$ transfers the data from the global cache memory 220 to the bank of disk drives 140 and resets the tag associated with data in the global cache memory 220 (i.e., un-tags the data) to indicate that the data in the global cache memory 220 has been transferred to the bank of disk drives 140 by sending a message to the cache memory manager 265. It is noted that the un-tagged data in the global cache memory 220 remains there until overwritten with new data. More particularly, in Step 416, the back end director transfers data from the cache memory 220 to the bank of disk drives 240 and sends a message to the cache memory manager 265 via the message network 260 to update the cache memory management table in memory 267 that the data is available for being removed by a subsequent read "miss" or write "miss". By removing the "write pending" flag the data will be overwritten by different data when a read or write miss occurs and the slot is at the head of the LRU list, unless it was re-written during that time and the write pending flag was re-established.

Considering in more detail the cache management table stored in memory 267 of the cache memory manager 265, as described above, the table is entered with a disk address from the host computer/server 120. The map stores, at that host/server provided disk address, an indication as to whether the data is in cache memory 220 (i.e., a "hit") or in the bank of disk drives 140 (i.e., a "miss"). If the table indicates that the data is in the cache memory 220, a back end director 200$_1$–200$_{32}$ transfers the data from the cache memory 220 to the bank of disk drives 140, in a write operation, or a front end director 180$_1$–180$_{32}$ transfers the data from the cache memory 220 to the host/server 120, in a read operation.

Referring now to FIG. 5, the cache memory table relating cache memory location (i.e., cache slot) and disk drive location, is shown. As described in Step 304 for the read operation, the front end director makes a request for the data at the disk address from the cache memory 220 by first sending a query to the cache memory manager 265 via the message network 260 asking whether the requested data is in the cache memory 220. Then, as described above in connection with Step 306, the cache memory manager 265 searches the cache memory management table (FIG. 5) an entry-by-entry basis until it locates the entry having stored therein the requested (i.e., addressed) disk drive.

More particularly, each memory slot is associated with a corresponding disk drive address. Thus, if there are n disk drive addresses, there are n cache memory slots. Each slot stores the status (e.g., the data is in the cache memory 220 (i.e., a "hit") or the data is not in the cache memory (i.e., a "miss"). As shown in FIG. 5, the cache memory manager 265 searches the cache memory management table (FIG. 5) an entry-by-entry basis until it locates the entry having stored therein the requested (i.e., addressed) disk drive. Thus, the search is made beginning with cache memory slot 1 and reading the information (i.e., status) in cache memory slot 1. Then if the information in slot 1 does not indicate that such slot 1 has the information for that addressed disk drive, the search goes to the next memory slot, i.e., slot 2, and the process continues step-by-step until the slot is found corresponding to the addressed disk drive.

Also included in the cache memory management table are, for each map address, miscellaneous control and other status information such as flags (e.g., "write pending", valid data, etc.), the time the data is written into the cache memory 220, and Least Recently Used (LRU) pointers.

In order to reduce the search time, the logical disk address provided by the host computer/server 120 is hashed and the cache management table in memory 267 of the cache memory manager 265 comprises a plurality of, m, tables, as shown in FIG. 5A. Each one of such m tables has a plurality, $n_m$, locations where the sum of the locations of the m tables equals n. In response to a query of the cache memory management table, as to whether data stored or to be stored in such disk location is in the cache memory, an the logical disk address provided by the host computer/server is hashed and such hashed address is fed to address one of the m tables in the cache memory manager.

More particularly, here, the cache memory management table is broken into a plurality of tables and the requests to the memory as hashed; i.e., here passed through a polynomial with random, but a priori known coefficients to try to provide a uniform distribution of storage among the plurality of tables. Thus, during write operations, the data is stored substantially uniformly among the m tables to reduce query times of such table by the cache memory manager 265. Now, having achieved this more uniform distribution among the m tables, the query time is reduced during the read operation.

Figure 6:
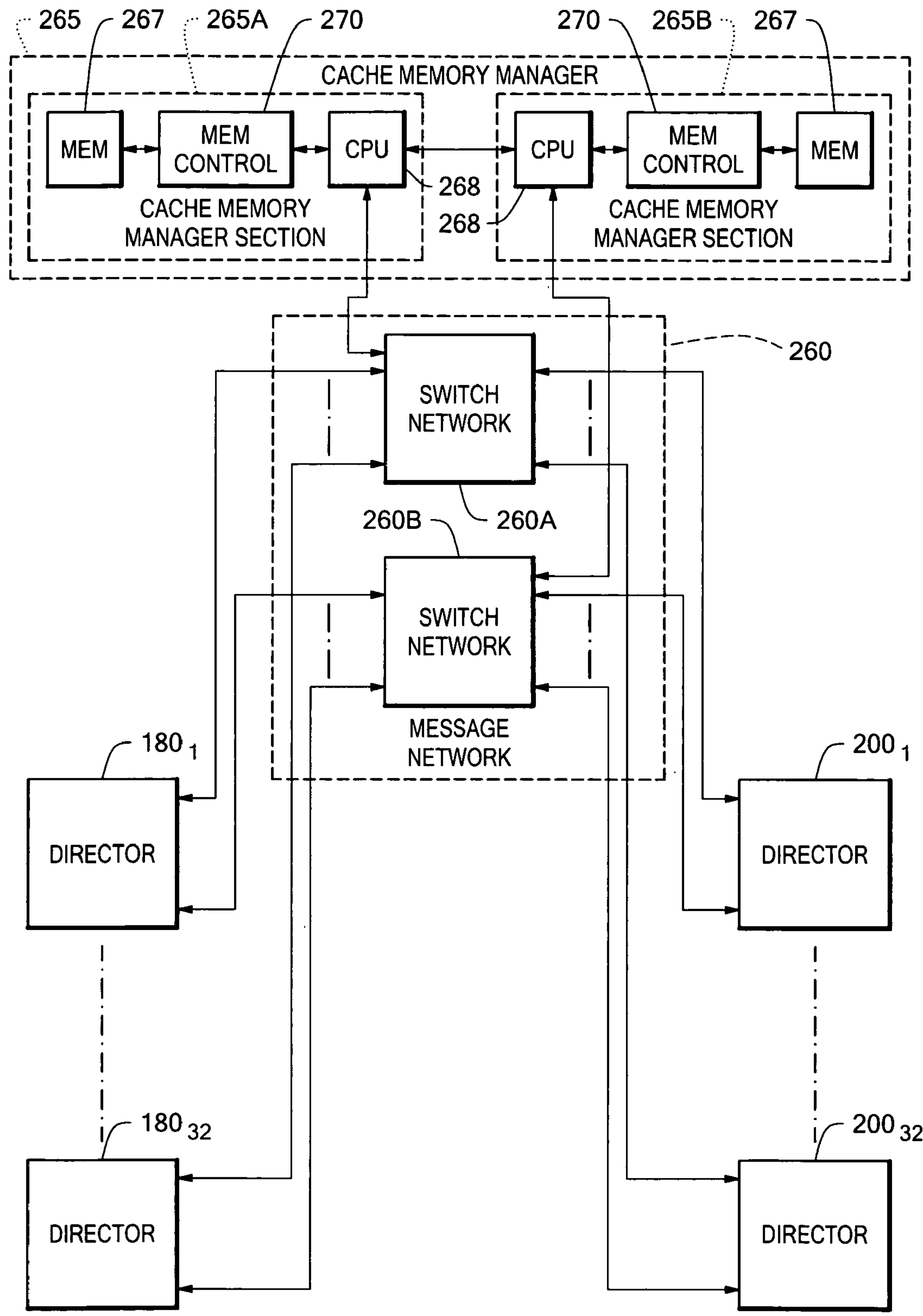
FIG. 6 is a more detailed diagram showing the relationship between the cache memory manager and other elements used in the data storage system of FIG. 2.

FIG. 6 shows in more detail the cache memory manager 265 and the message network 260. Further details of the message network 260 are provided in the above-referenced co-pending patent application. Suffice it to say here that the message network includes a pair of redundant switch networks 270A and 270B, one being a primary and the other a secondary, each being able to interconnect one of more of the directors 180$_1$–180$_{32}$ and 200$_1$–200$_{32}$ as described in the above reference co-pending patent applications.

The cache memory manger 265 includes a pair of redundant cache memory manager sections 265A, 265B each including a CPU 2678A, 268B, memory controller 270A, 270B and cache memory management table memory 267A, 267B, respectively, with the CPUs 268A and 268B being interconnected by bus 269.

Figure 7:
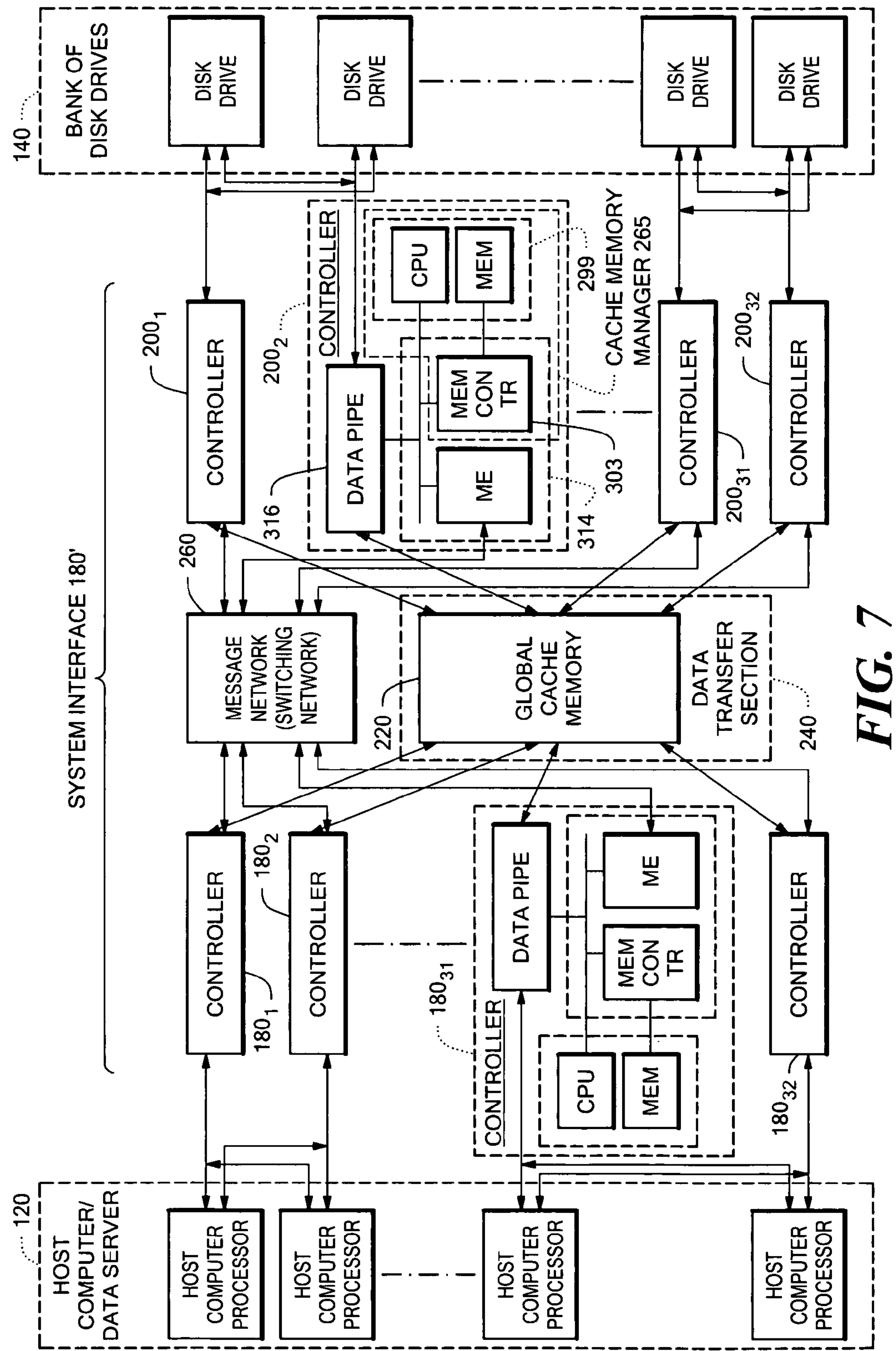
FIG. 7 is a block diagram of a data storage system according to another embodiment of the invention.

Referring now to FIG. 7, here the data storage system interface 180' has the cache memory manger 265 disposed in at least one of the back end directors, as shown for back end director 200$_2$. Further, because each back end director includes a memory and CPU (i.e., microprocessor 299) and memory controller 303, the control instructions described above and performed by the cache memory manager 265 in FIGS. 2, 3 and 4) are in the memory of the back-end director 200$_2$ and the memory controller 303 thereof is modified to enable execution of such instructions to carry out such control instructions and hence the cache memory control functions descried above. It should be noted that having the cache memory manager in one or more of the back end directors has the advantage that there is no messaging on "misses" nor any for de-staging.

It should be noted that the system might have multiple cache memory managers separated by logical or physical devices.

Figure 8:
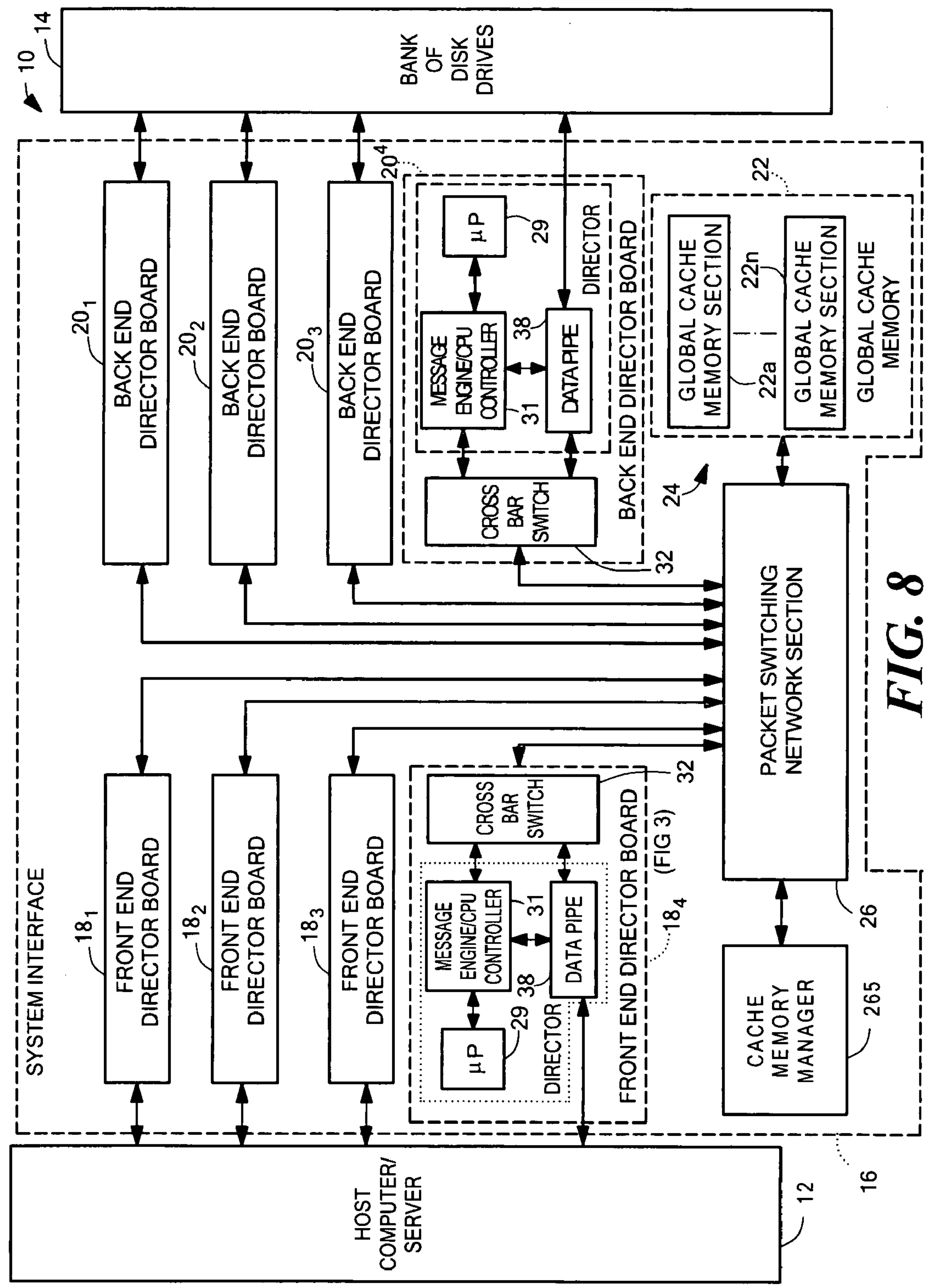
FIG. 8 is a block diagram of a data storage system having a packet switching network according to the invention.

Referring now to FIG. 8 a data storage system 10 is shown for transferring data between a host computer/server 12 and a bank of disk drives 14 through a system interface 16. The system interface 16 includes: a plurality of, here for example four, front-end directors 18$_1$–18$_4$ coupled to the host computer/server 12; a plurality of, here for example, four, back-end directors 20$_1$–20$_4$ coupled to the bank of disk drives 14. The interface 16 includes a data transfer section 24, having a global cache memory 22. The global cache memory includes a plurality of, here, n, global cache memory sections $22_a$–$22_n$, as shown. The front-end and back-end directors $18_1$–$18_4$, $20_1$–$20_4$ and the global cache memory communicate with one another through a packet switching network. The packet switching network includes crossbar switches 32 coupled to each one the directors, as shown, and a packet switching network section 26. The cache memory manager 265 is interconnected to the packet switching network via the packet switching network section 26.

The front-end and back-end directors $18_1$–$18_4$, $20_1$–$20_4$ are functionally similar and include a microprocessor (μP) 29 (i.e., a central processing unit (CPU) and RAM), a message engine/CPU controller having a message engine and a memory controller 37; and, a data pipe 38, arranged as shown and described in more detail in co-pending patent application Ser. No. 09/540,828 filed Mar. 31, 2000, inventor Yuval Ofek et al., assigned to the same assignee as the present invention, the entire subject matter thereof being incorporated by reference. Suffice it to say here, however, that the front-end and back-end directors $18_1$–$18_4$, $20_1$–$20_4$ control data transfer between the host computer/server 12 and the bank of disk drives 14 in response to messages passing between the directors $18_1$–$18_4$, $20_1$–$20_4$ through the packet switching network. The messages facilitate the data transfer between host computer/server 12 and the bank of disk drives 14 with such data passing through the global cache memory 22 via the data transfer section 24. More particularly, in the case of the front-end directors $18_1$–$18_4$, the data passes between the host computer to the global cache memory 22 through the data pipe 31 in the front-end directors $18_1$–$18_4$ and the messages pass through the message engine/CPU controller 31 in such front-end directors $18_1$–$18_4$. In the case of the back-end directors $20_1$–$20_4$ the data passes between the back-end directors $20_1$–$20_4$ and the bank of disk drives 14 and the global cache memory 22 through the data pipe 38 in the back-end directors $20_1$–$20_4$ and again the messages pass through the message engine/CPU controller 31 in such back-end director $20_1$–$20_4$.

Figures 8A, 9:
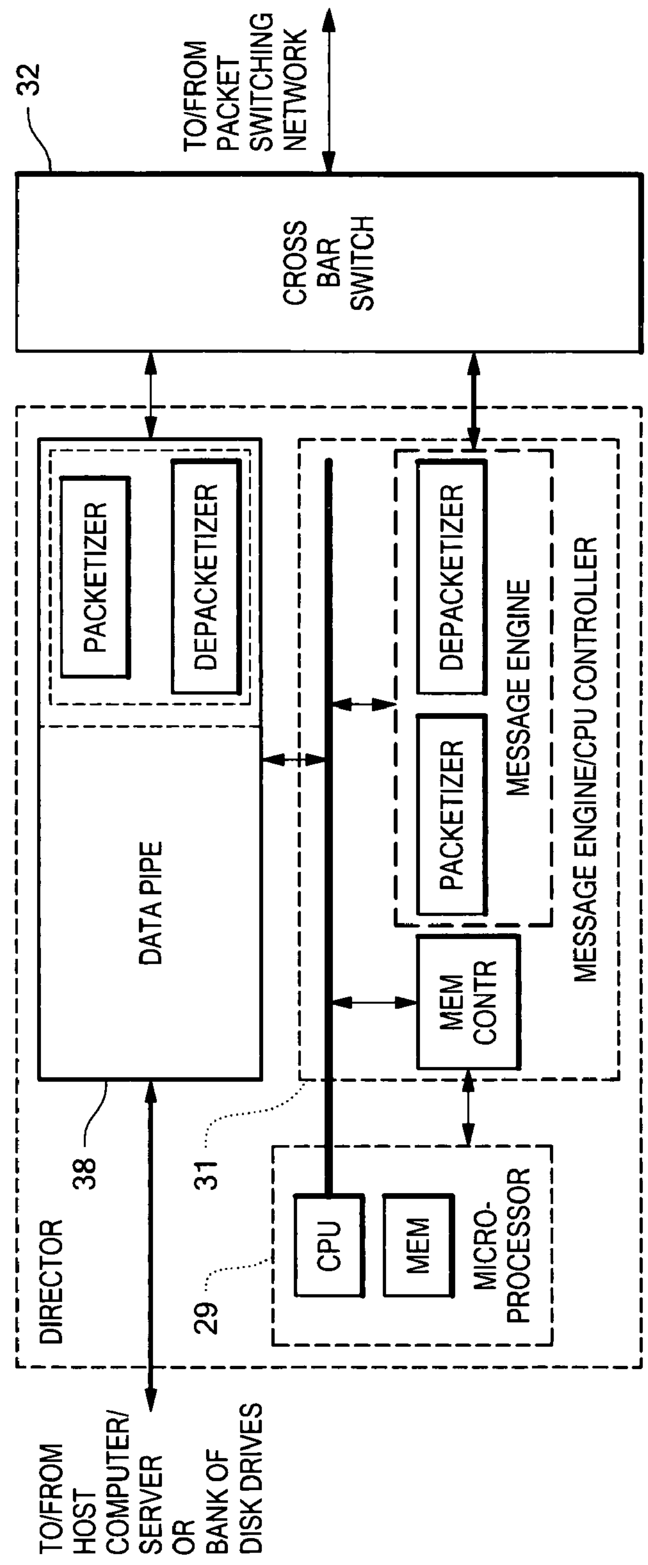
FIG. 8A is a diagram of a packet used in the data storage system of FIG. 2.
FIG. 9 is a block diagram of an exemplary one of the directors used in the system of FIG. 8.

It is noted that here the front-end and back-end directors $18_1$–$18_4$, $20_1$–$20_4$ are coupled to the crossbar switch 32, as shown in more detail in FIG. 9. The crossbar switch 32, here a switching fabric, is also coupled to the packet switching network 26 to provide the packet switching network for the system interface 16.

Each message which is created by the microprocessor 29 under software control is stored in a send queue in RAM, not shown. When the message is to be read from the send queue in RAM, not shown, and transmitted through the message network 26 (FIG. 8) to one or more other directors via a DMA operation it is packetized in a packetizer into a packet, shown in FIG. 8A. For directors, each one of the packets includes the following fields: command; a source ID (i.e., transmitting director); a destination ID (i.e., receiving director) address; a payload; and terminates with a 4-byte Cyclic Redundancy Check (CRC), as shown in FIG. 8A. For data passing to and from the global memory, each one of the packets includes the following fields: command (e.g., read, write); a source ID (i.e., transmitting source) and destination ID (i.e., receiving memory location (i.e., the location in global memory for the configuration shown in FIG. 8, or the director board ID having the global cache memory section and offset, as with the configuration to be described in FIG. 11.

The packet is sent to the crossbar switch 32. The destination portion of the packet is used to indicate the destination for the message and is decoded by the switch 32 to determine the message routing through the packet switching network section 26. The decoding process uses a routing table, not shown, in the packet switching network section 26, such routing table being initialized by controller during power-up by the initialization and diagnostic processor (controller), not shown. The routing table provides the relationship between the destination address portion of the packet, which identifies the routing for the message and the one of directors $18_1$–$18_4$, $20_1$–$20_{34}$ to which the message is to be directed.

Here, referring also to FIG. 9, the data pipe 38 also includes a packetizer and depacketizer to transmit and receive the data to and from the cache memory 22 using the same transmission, i.e., packet protocol, as that used by the message engine/CPU controller. The destination portion of the packet is used to indicate the destination, i.e., address in the cache memory 22 for storage of the data during a write or retrieval of data stored in the cache memory 22 during a read and is decoded by the switch 32 to determine the message routing through the packet switching network 26. The decoding process uses a decoder table, not shown, in the packet switching network 26, such routing table being initialized by controller during power-up by the initialization and diagnostic processor (controller), not shown. The table provides the relationship between the destination address portion of the packet, which identifies the routing for the data and the location in the cache memory for writing or reading the data, as the case may be.

Figure 10:
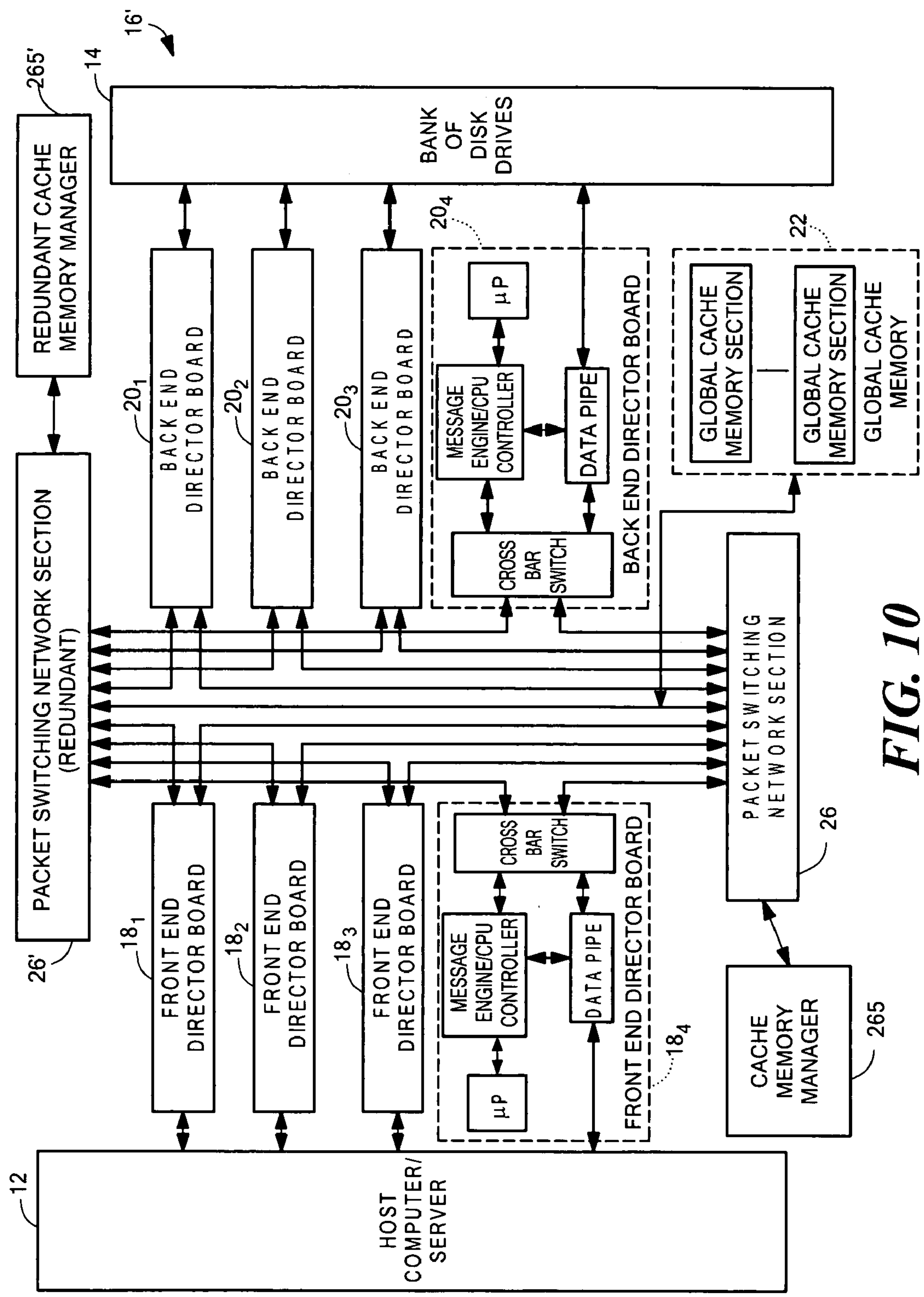
FIG. 10 is a block diagram of a data storage system according to an alternative embodiment of the invention.

Referring now to FIG. 10, an alternative embodiment of the system interface 16, designated as system interface 16', is shown. Here, a redundant packet switching network 16' is included. It should be noted that the system may use a single packet switching network where such packet switching network includes sufficient redundant connections to allow full system connectivity in the event of a failure as shown in FIGS. 14, 15A–15C, to be described. It is noted that the cache memory manager 265 is interconnected to the packet switching network via the packet switching network section 26.

Figure 11:
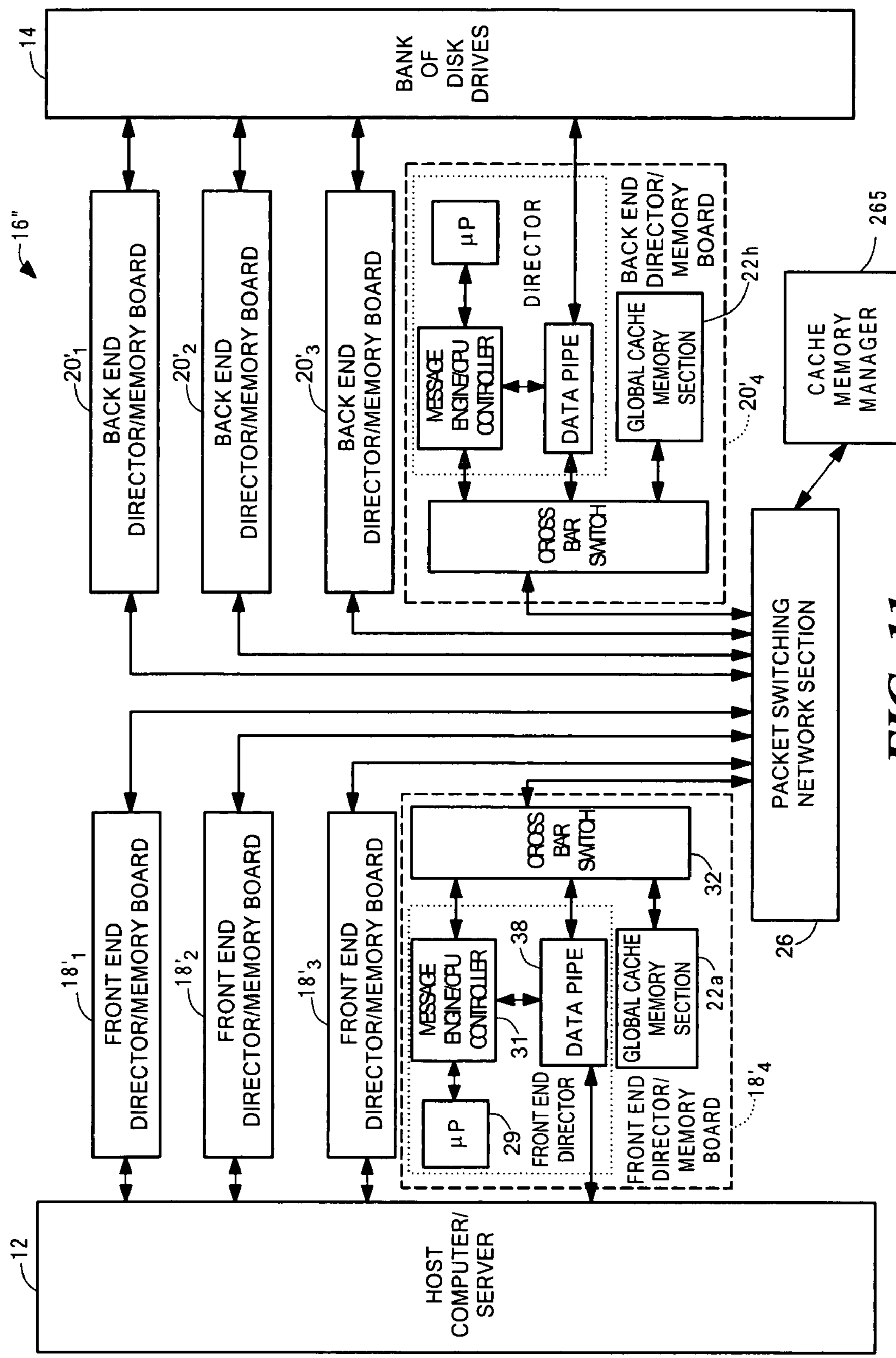
FIG. 11 is a block diagram of a data storage system according to an alternative embodiment of the invention.

Referring now to FIG. 11, an alternative embodiment of the system interface 16, designated as system interface 16", is shown. Here, the system interface 16" includes a plurality of, here for example four, front-end director/memory boards $18'_1$–$18'_4$ coupled to the host computer/server 12; a plurality of, here for example, four, back-end director/memory boards $20'_1$–$20'_4$ coupled to the bank of disk drives 14. The interface 16" includes a data transfer section having a global cache memory, the global memory cache 22 has the global cache memory sections thereof, here sections $22_a$–$22_n$, here $22_1$–$22_8$ distributed among the front-end director/memory boards $18'_1$–$18'_4$ and the back-end director/memory boards $20'_1$–$20'_4$, respectively as shown. The cache memory manager 265 is interconnected to the packet switching network via the packet switching network section 26.

Figure 12:
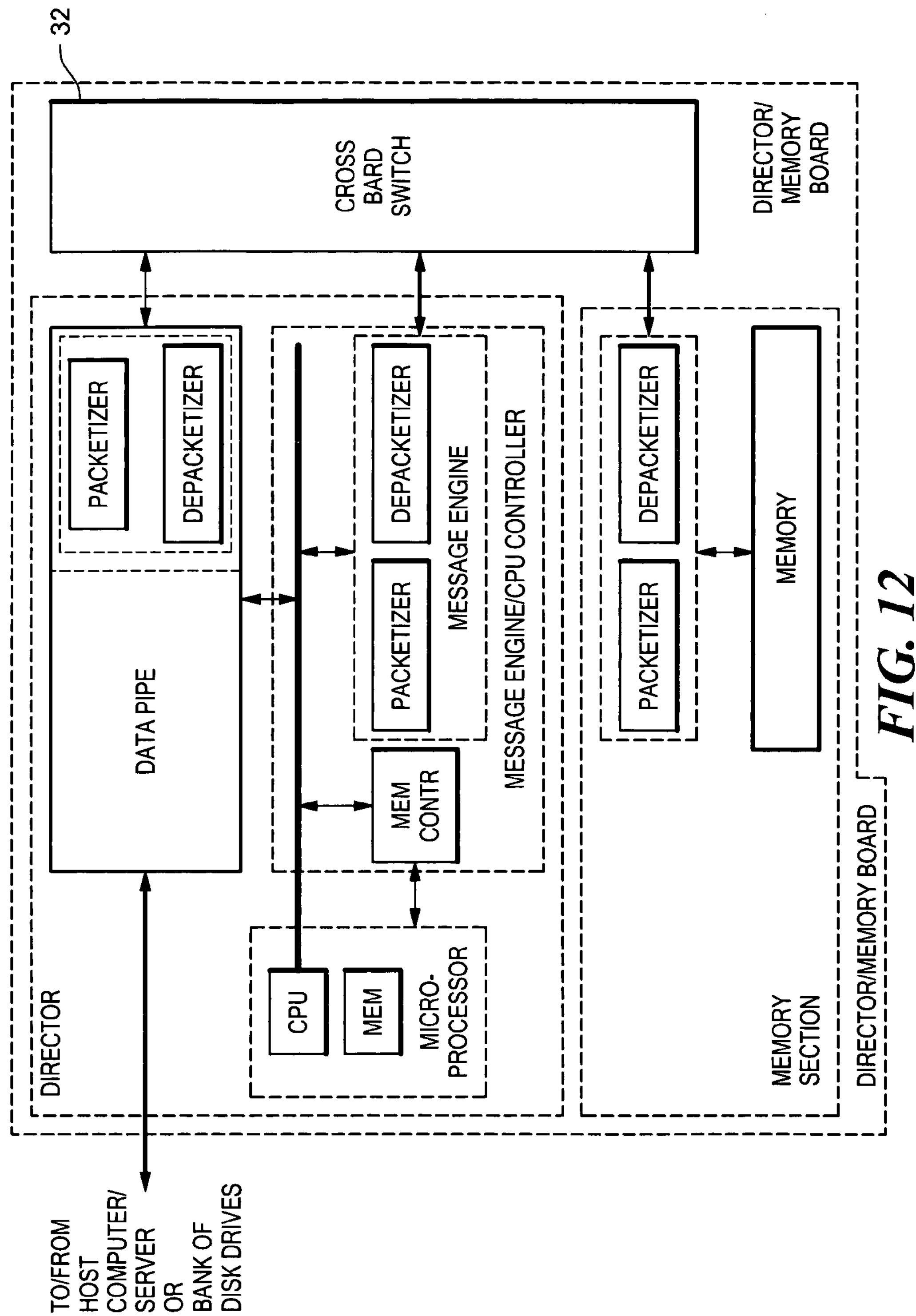
FIG. 12 is a block diagram of an exemplary director/memory board adapted for use in the system of FIG. 11.

An exemplary one of the front-end director/memory boards $18'_1$–$18'_4$ and the back-end director/memory boards $20'_1$–$20'_4$ is shown in FIG. 12. It is noted that because here packet switching is being used, the memory section includes a packetizer and depacketizer to enable a common packet switching protocol to be used for the data pipe, the message engine/CPU controller and the memory section. The data packet passed to and from the global memory is shown in FIG. 8A. It is also noted that a memory section on a director/memory board is able to communicate with the data pipe on the same board via the crossbar switch on such board. Thus, as noted above, the crossbar switches are part of the overall packet switching network. Thus, the front-end and back-end directors $18_1$–$18_4$, $20_1$–$20_4$ and the global cache memory sections $22_1$–$22_8$ communicate with one another through the packet switching network as described above, such network including the crossbar switches and the packet switching section 26.

Figure 13:
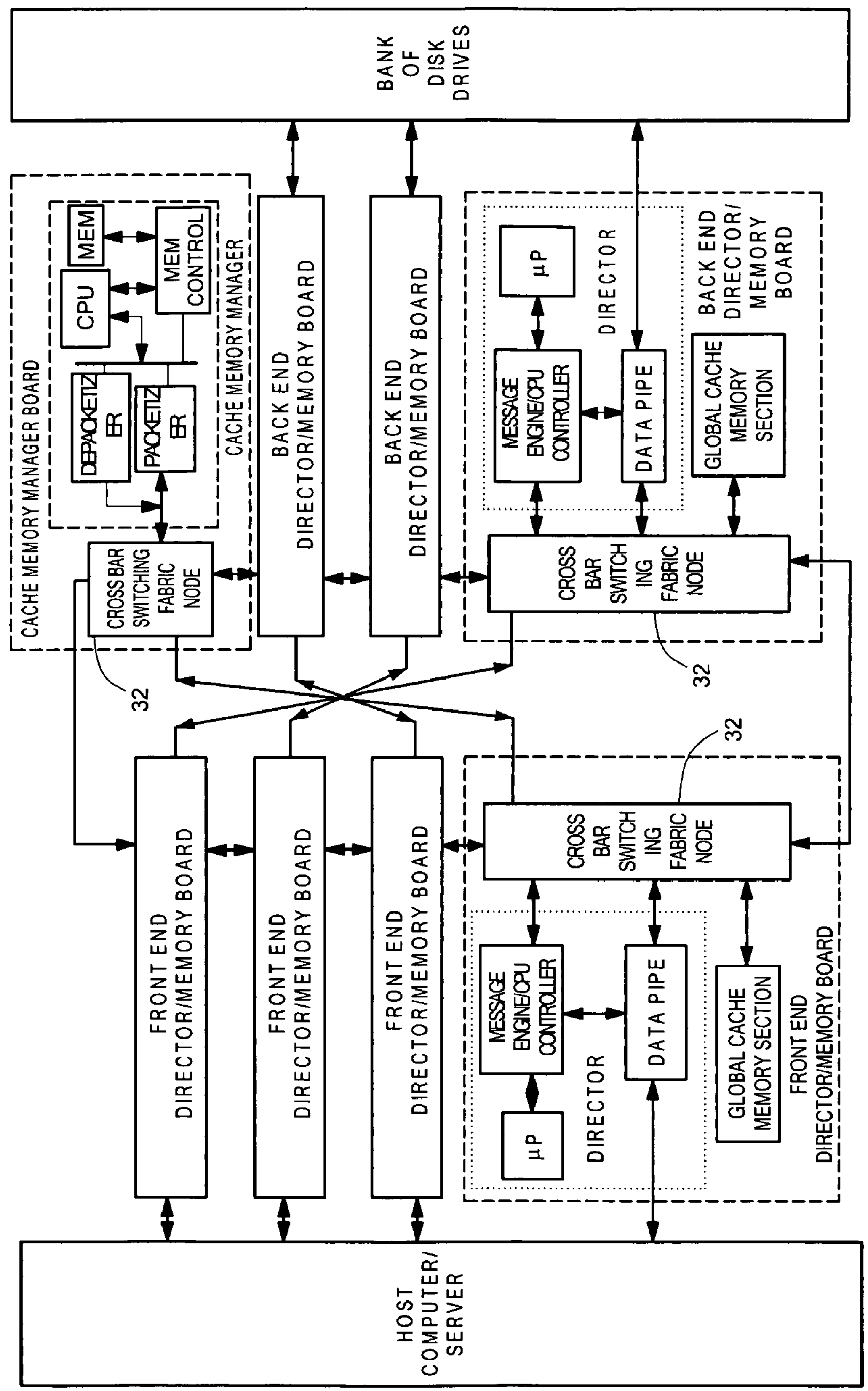
FIG. 13 is a block diagram of a data storage system according to another embodiment of the invention.
Figure 14:
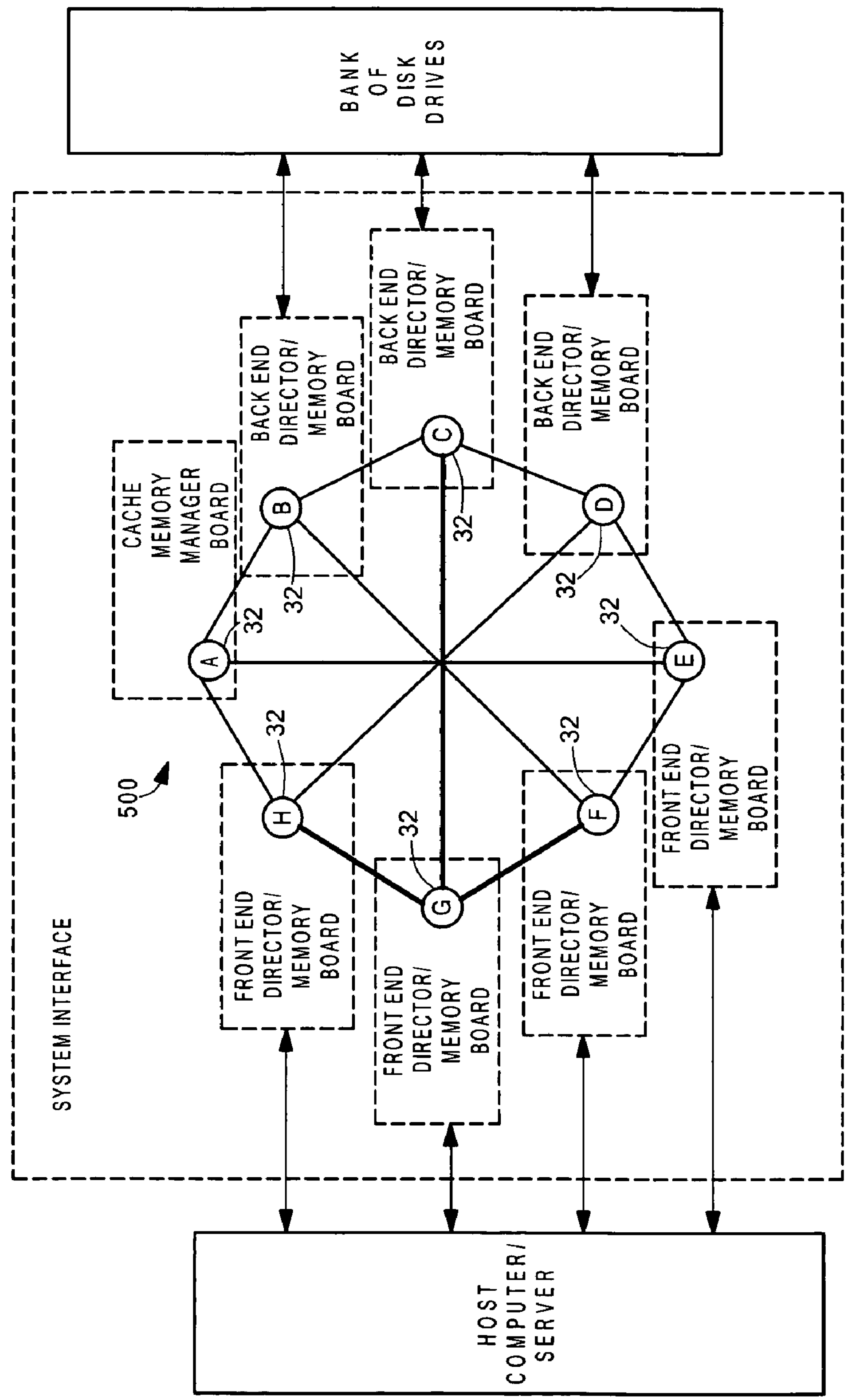
FIG. 14 is a block diagram of a data storage system according to the invention as configured in FIG. 13 having seven director/memory boards and a cache memory manager board according to the invention, each one of the seven director/memory boards and the cache memory manager board providing a node of the packet switching network.

Referring to FIG. 13 an alternative embodiment of the system interface is shown. Here, instead of coupling each one of the crossbar switches to the packet switching network section 26 to provide the packet switching network for the system interface, the crossbars switches are interconnected as shown in FIGS. 13 and 14. It is noted one of the boards is a cache memory manager board having the cache memory manager 265. Thus, as shown in FIG. 14, each crossbar switch may be considered as a switching node, here designated as nodes A through H. Thus, the crossbar switches for nodes A–H provide a packet switching network 500.

Thus, as noted above in connection with FIG. 13, each one of the directors is coupled to a crossbar switch. The crossbar switch is directly connected to crossbar switch of at least two other ones of the directors and indirectly connected to crossbar switching fabric of other ones of the directors through the at least two directly connected directors. Thus:

Crossbar switch A is directly connected to crossbar switches B, E and H and is indirectly coupled to the other ones of the crossbars switches (i.e., switches C, D, F, and G) though one of directly connected crossbars switches B, E and H. For example, switch D is indirectly coupled to switch A through directly connected switch H.

Crossbar switch B is directly connected to crossbar switches A, C and F and is indirectly coupled to the other ones of the crossbars switches (i.e., switches D, E, G, and H) though one of directly connected the crossbars switches A, C and F.

In like manner, crossbar switch C is directly connected to crossbar switches B, D and G and is indirectly coupled to the other ones of the crossbars switches. Crossbar switch D is directly connected to crossbar switches C, E and H. Crossbar switch E is directly connected to crossbar switches D, F and A. Crossbar switch F is directly connected to crossbar switches E, G and B and is indirectly coupled to the other ones of the crossbar switches. Crossbar switch G is directly connected to crossbar switches H, F and C and is indirectly coupled to the other ones of the crossbar switches. Crossbar switch H is directly connected to crossbar switches A, G and D and is indirectly coupled to the other ones of the crossbar switches.

Thus, each one of the directors is coupled to a crossbar switch. The switch is directly connected to crossbar switch of at least two other ones of the crossbar switches and indirectly connected to other ones of the crossbar switches through the at least two directly connected crossbar switches. Thus, as noted above, the packet switching network comprises the crossbar switches of the directly and indirectly connected crossbar switch.

Figure 15A:
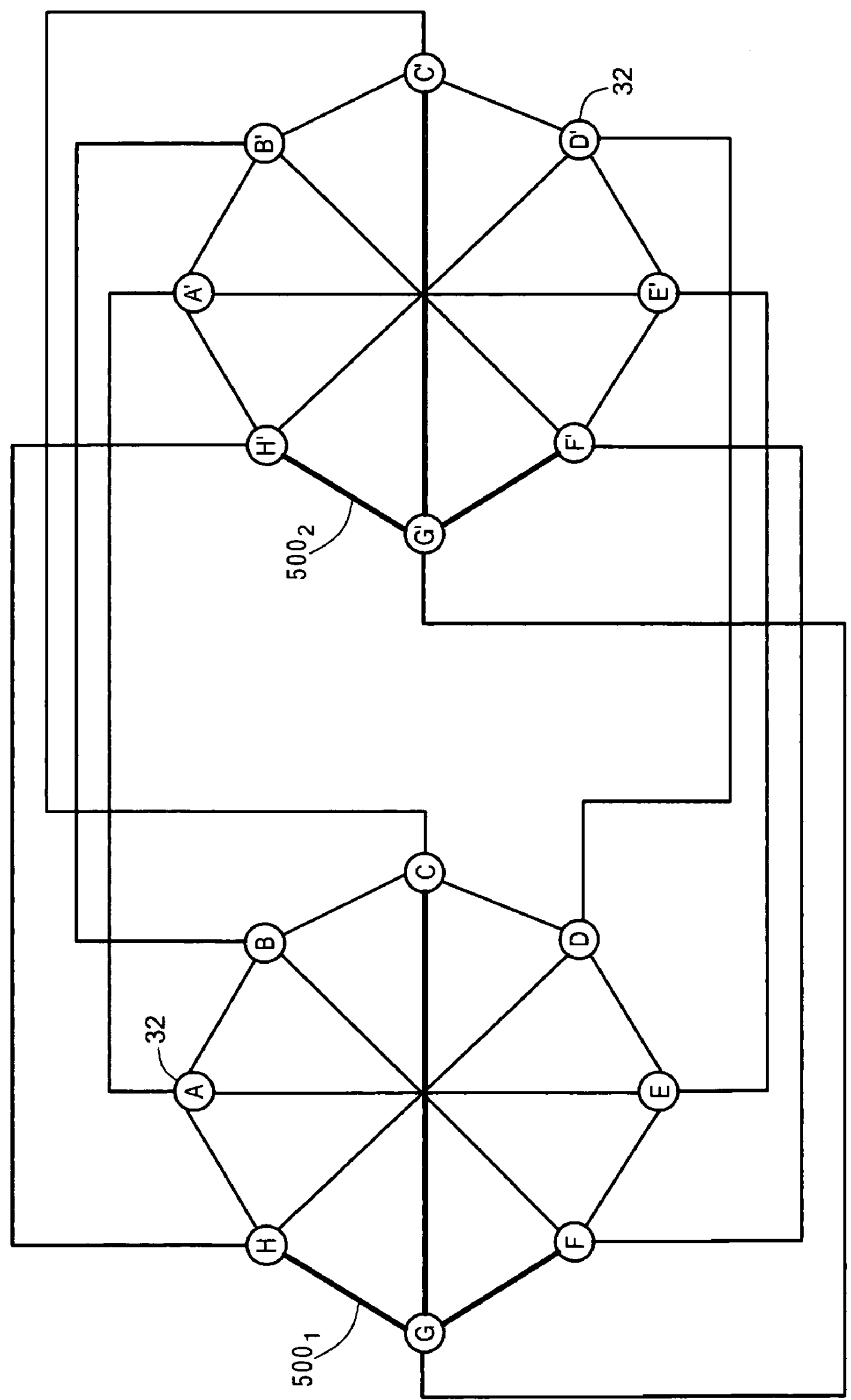
FIG. 15A is a diagram of a data storage system according to the invention as configured in FIG. 13 16 nodes 1 boards.

Referring now to FIG. 15A, a pair of interconnected packet switching networks $\mathbf{500}_1$, $\mathbf{500}_2$ is shown to provide a packet switching network for sixteen directors or sixteen director/memory boards. Thus, the connection of the nodes of network $\mathbf{500}_1$ to the nodes of network $\mathbf{100}_2$ are presented in below:

Node A of network $\mathbf{500}_1$ is connected directly to Node A of network $\mathbf{500}_2$;

Node B of network $\mathbf{500}_1$ is connected directly to Node B of network $\mathbf{500}_2$;

Node C of network $\mathbf{500}_1$ is connected directly to Node C of network $\mathbf{500}_2$;

Node D of network $\mathbf{500}_1$ is connected directly to Node D of network $\mathbf{500}_2$;

Node E of network $\mathbf{500}_1$ is connected directly to Node E of network $\mathbf{500}_2$;

Node F of network $\mathbf{500}_1$ is connected directly to Node F of network $\mathbf{500}_2$;

Node G of network $\mathbf{500}_1$ is connected directly to Node G of network $\mathbf{500}_2$;

Node H of network $\mathbf{500}_1$ is connected directly to Node H of network $\mathbf{500}_2$.

It should be noted that with such connections, information sent by each one of the nodes (i.e., a source node) of one of the networks $\mathbf{500}_1$, $\mathbf{500}_2$ may be required to pass to two nodes of the other network before reaching a destination node of the other network (i.e., two hops are required). For example, considering node G of network $\mathbf{100}_1$ as the source node and node D of network $\mathbf{500}_2$ as the destination node, information from the source node G of network $\mathbf{500}_1$ must pass through, for example, node H of network $\mathbf{500}_1$ and then through node H of network $\mathbf{500}_2$ before reaching destination node D of network $\mathbf{500}_2$. Likewise, again considering node G of network $\mathbf{500}_1$ as the source node and node B of network $\mathbf{500}_2$ as the destination node, information from the source node G of network $\mathbf{500}_1$ must pass through, for example, node F of network $\mathbf{500}_1$ and then through node F of network $\mathbf{500}_2$ before reaching destination node D of network $\mathbf{500}_2$.

Figure 15B:
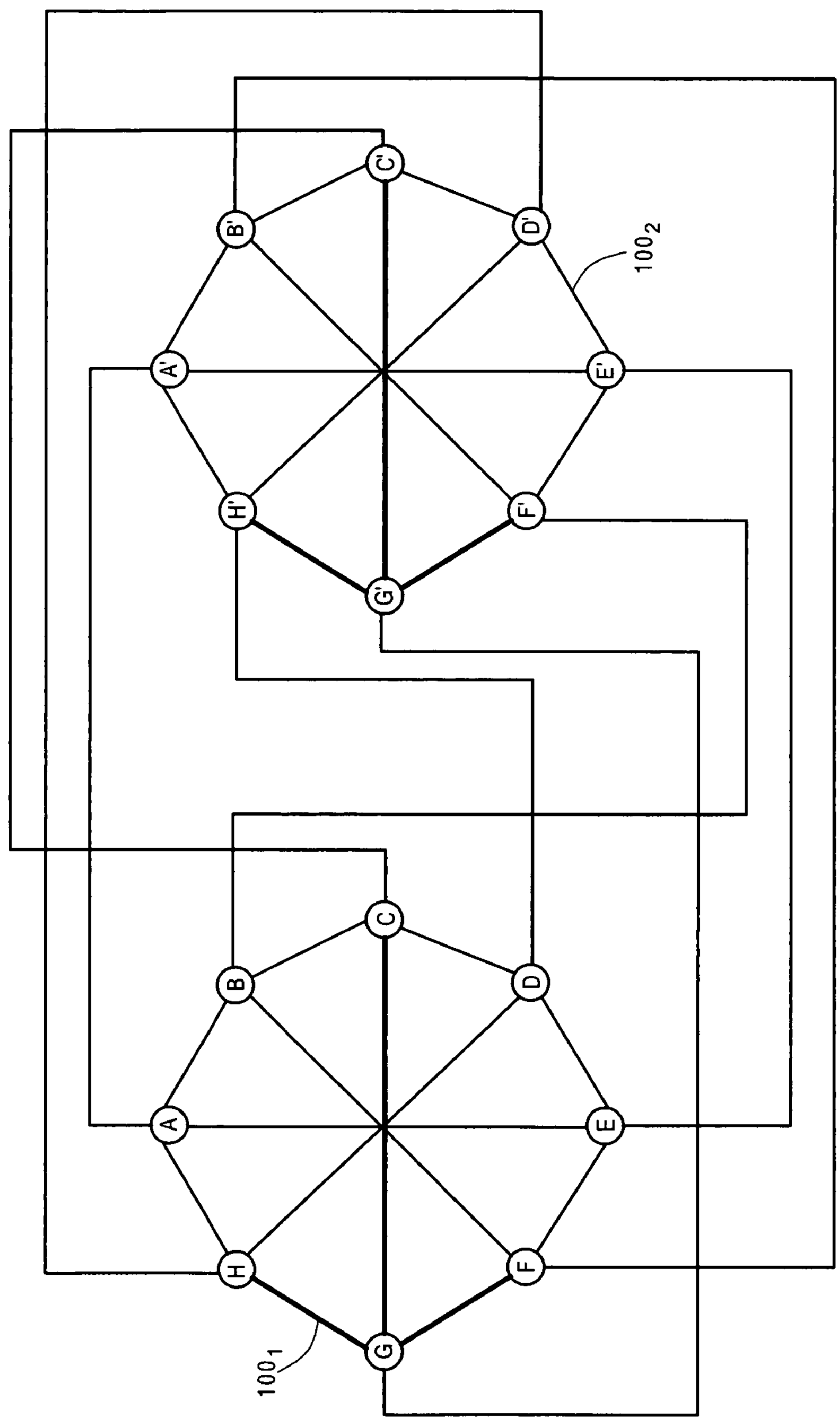
FIG. 15B is a diagram of a data storage system according to the invention as configured in FIG. 13 having additional boards providing 16 nodes interconnected differently from the interconnections shown in FIG. 15, here such interconnections having a minimum number of nodal transport hops.

Referring to FIG. 15B an arrangement is shown which eliminates this two-hop condition. Here, the connection of the nodes of network $\mathbf{500}_1$ to the nodes of network $\mathbf{500}_2$ are presented in below:

Node A of network $\mathbf{500}_1$ is connected directly to Node A of network $\mathbf{500}_2$;

Node B of network $\mathbf{500}_1$ is connected directly to Node F of network $\mathbf{500}_2$;

Node C of network $\mathbf{500}_1$ is connected directly to Node C of network $\mathbf{500}_2$;

Node D of network $\mathbf{500}_1$ is connected directly to Node H of network $\mathbf{500}_2$;

Node E of network $\mathbf{500}_1$ is connected directly to Node E of network $\mathbf{500}_2$;

Node F of network $\mathbf{500}_1$ is connected directly to Node B of network $\mathbf{500}_2$;

Node G of network $\mathbf{500}_1$ is connected directly to Node G of network $\mathbf{500}_2$;

Node H of network $\mathbf{500}_1$ is connected directly to Node D of network $\mathbf{500}_2$.

Thus, it is noted that here and considering node G of network $\mathbf{500}_1$, such node is directly connected to node G of network $\mathbf{500}_2$. It is further noted that two of the nodes H and F of network $\mathbf{500}_1$ which are directly connected to node G of node $\mathbf{500}_1$ are connected to nodes of network $\mathbf{500}_2$ which are indirectly connected to node G of network $\mathbf{100}_2$.

Thus, in general, here each one of the packet switching networks includes: a plurality of crossbar switches, each crossbar switch being connected: (1) directly to crossbar switches of at least two other ones of crossbar switches in such one of the packet switching networks and to one of the crossbar switches of a second one of the plurality of packet switching networks; and, (2) indirectly to other ones of the crossbar switches of such one of the packet switching networks via the crossbar switch directly connected to such one of the packet switching fabric. Two of said at least two other ones of the crossbar switches in such one of the packet switching networks are connected indirectly to two crossbar switches of the second one of the packet switching networks, such two crossbar switches of the second one of the packet switching networks being crossbar switches connected indirectly to said one of the crossbar switches of the second one of the plurality of packet switching networks.

Figure 15C:
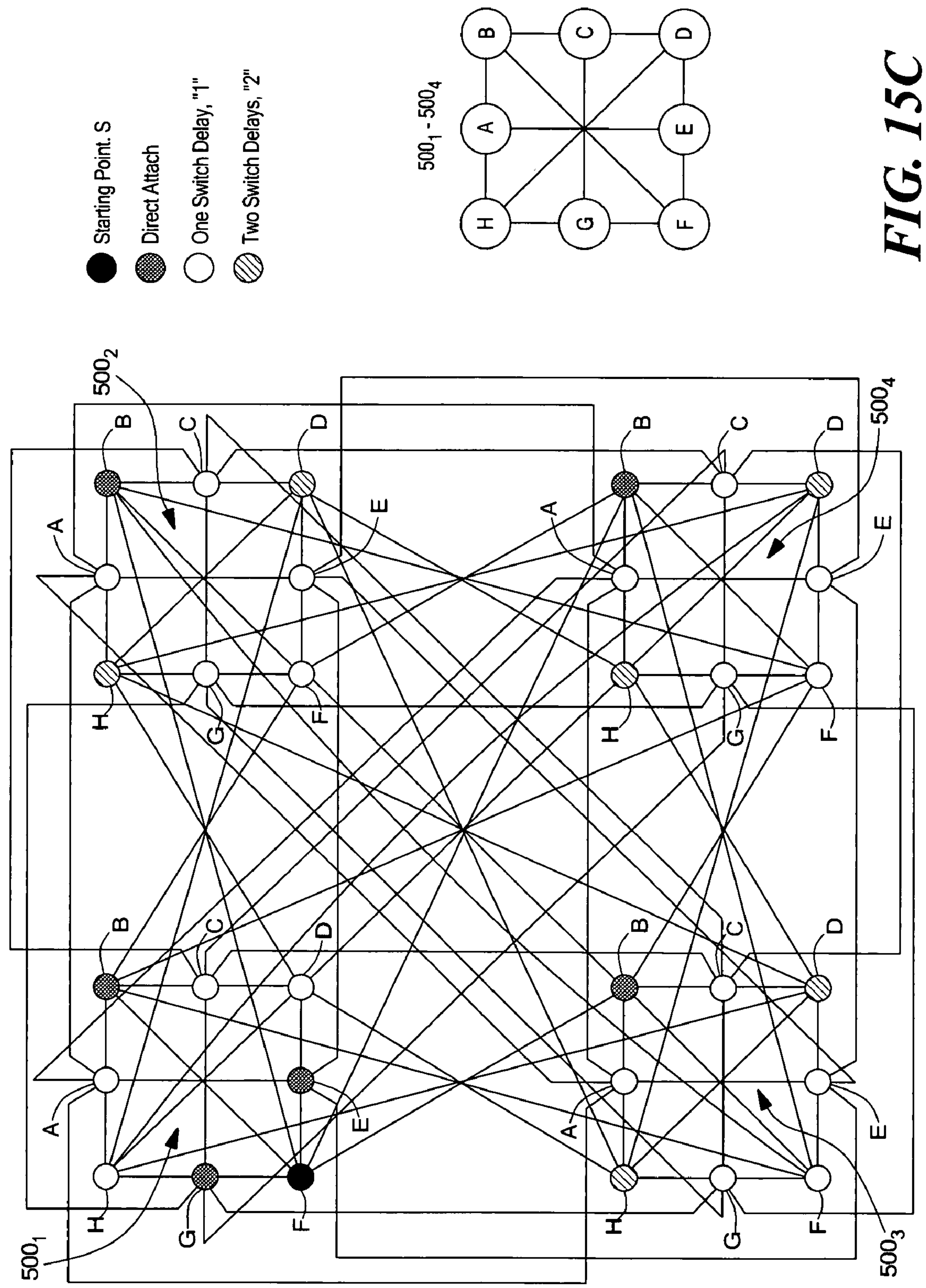
FIG. 15C is a diagram of a data storage system according to the invention as configured in FIG. 13 having still additional boards providing 32 nodes interconnected according to the invention.

Referring now to FIG. 15C, an arrangement is shown for interconnecting 32 nodes using four of the networks 100 sown in FIG. 14; i.e., networks $\mathbf{500}_1$–$\mathbf{500}_4$. The nodes are interconnected using the principle set forth above in connection with FIG. 15B. Thus, the interconnections are as forth below:

| Network $500_1$: | Network $500_2$ | Network $500_3$ | Network $500_4$ |
|---|---|---|---|
| A - E | A - E | A - E | A - E |
| B - F | B - F | B - F | B - F |
| C - G | C - G | C - G | C - G |
| D - H | D - H | D - H | D - H |
| A - B | A - B | A - B | A - B |
| B - C | B - C | B - C | B - C |
| C - D | C - D | C - D | C - D |
| D - E | D - E | D - E | D - E |
| E - F | E - F | E - F | E - F |
| F - G | F - G | F - G | F - G |
| G - H | G - H | G - H | G - H |
| H - A | H - A | H - A | H - A |

Interconnects:
Node A of network $500_1$ is connected directly to Node A of network $500_2$;
Node B of network $500_1$ is connected directly to Node F of network $500_2$;
Node C of network $500_1$ is connected directly to Node C of network $500_2$;
Node D of network $500_1$ is connected directly to Node H of network $500_2$;
Node E of network $500_1$ is connected directly to Node E of network $500_2$;
Node F of network $500_1$ is connected directly to Node B of network $500_2$;
Node G of network $500_1$ is connected directly to Node G of network $500_2$;
Node H of network $500_1$ is connected directly to Node D of network $500_2$.
Node A of network $500_1$ is connected directly to Node A of network $500_3$;
Node B of network $500_1$ is connected directly to Node F of network $500_3$;
Node C of network $500_1$ is connected directly to Node C of network $500_3$;
Node D of network $500_1$ is connected directly to Node H of network $500_3$;
Node E of network $500_1$ is connected directly to Node E of network $500_3$;
Node F of network $500_1$ is connected directly to Node B of network $500_3$;
Node G of network $500_1$ is connected directly to Node G of network $500_3$;
Node H of network $500_1$ is connected directly to Node D of network $500_3$.
Node A of network $500_1$ is connected directly to Node A of network $500_4$;
Node B of network $500_1$ is connected directly to Node F of network $500_4$;
Node C of network $500_1$ is connected directly to Node C of network $500_4$;
Node D of network $500_1$ is connected directly to Node H of network $500_4$;
Node E of network $500_1$ is connected directly to Node E of network $500_4$;
Node F of network $500_1$ is connected directly to Node B of network $500_4$;
Node G of network $500_1$ is connected directly to Node G of network $500_4$;
Node H of network $500_1$ is connected directly to Node D of network $500_4$.
Node A of network $500_2$ is connected directly to Node A of network $500_3$;
Node B of network $500_2$ is connected directly to Node F of network $500_3$;
Node C of network $500_2$ is connected directly to Node C of network $500_3$;
Node D of network $500_2$ is connected directly to Node H of network $500_3$;
Node E of network $500_2$ is connected directly to Node E of network $500_3$;
Node F of network $500_2$ is connected directly to Node B of network $500_3$;
Node G of network $500_2$ is connected directly to Node G of network $500_3$;
Node H of network $500_2$ is connected directly to Node D of network $500_3$.
Node A of network $500_2$ is connected directly to Node A of network $500_4$;
Node B of network $500_2$ is connected directly to Node F of network $500_4$;
Node C of network $500_2$ is connected directly to Node C of network $500_4$;
Node D of network $500_2$ is connected directly to Node H of network $500_4$;
Node E of network $500_2$ is connected directly to Node E of network $500_4$;
Node F of network $500_2$ is connected directly to Node B of network $500_4$;
Node G of network $500_2$ is connected directly to Node G of network $500_4$;
Node H of network $500_2$ is connected directly to Node D of network $500_4$.
Node A of network $500_3$ is connected directly to Node A of network $500_4$;
Node B of network $500_3$ is connected directly to Node F of network $500_4$;
Node C of network $500_3$ is connected directly to Node C of network $500_4$;

-continued

| Network $500_1$: | Network $500_2$ | Network $500_3$ | Network $500_4$ |
|---|---|---|---|

Node D of network $500_3$ is connected directly to Node H of network $500_4$;
Node E of network $500_3$ is connected directly to Node E of network $500_4$;
Node F of network $500_3$ is connected directly to Node B of network $500_4$;
Node G of network $500_3$ is connected directly to Node G of network $500_4$;
Node H of network $500_3$ is connected directly to Node D of network $500_4$.

Thus, considering node F of network $\mathbf{500}_1$ as a staring node for example, it is noted that connections from such node F of network $\mathbf{500}_1$ to all other nodes are direct except for: nodes indicated by "1" which have one hop; and nodes indicated by "2" which have two hops. Thus, there are 16 one-hop interconnections and 6 two-hop interconnections.

Figure 16:
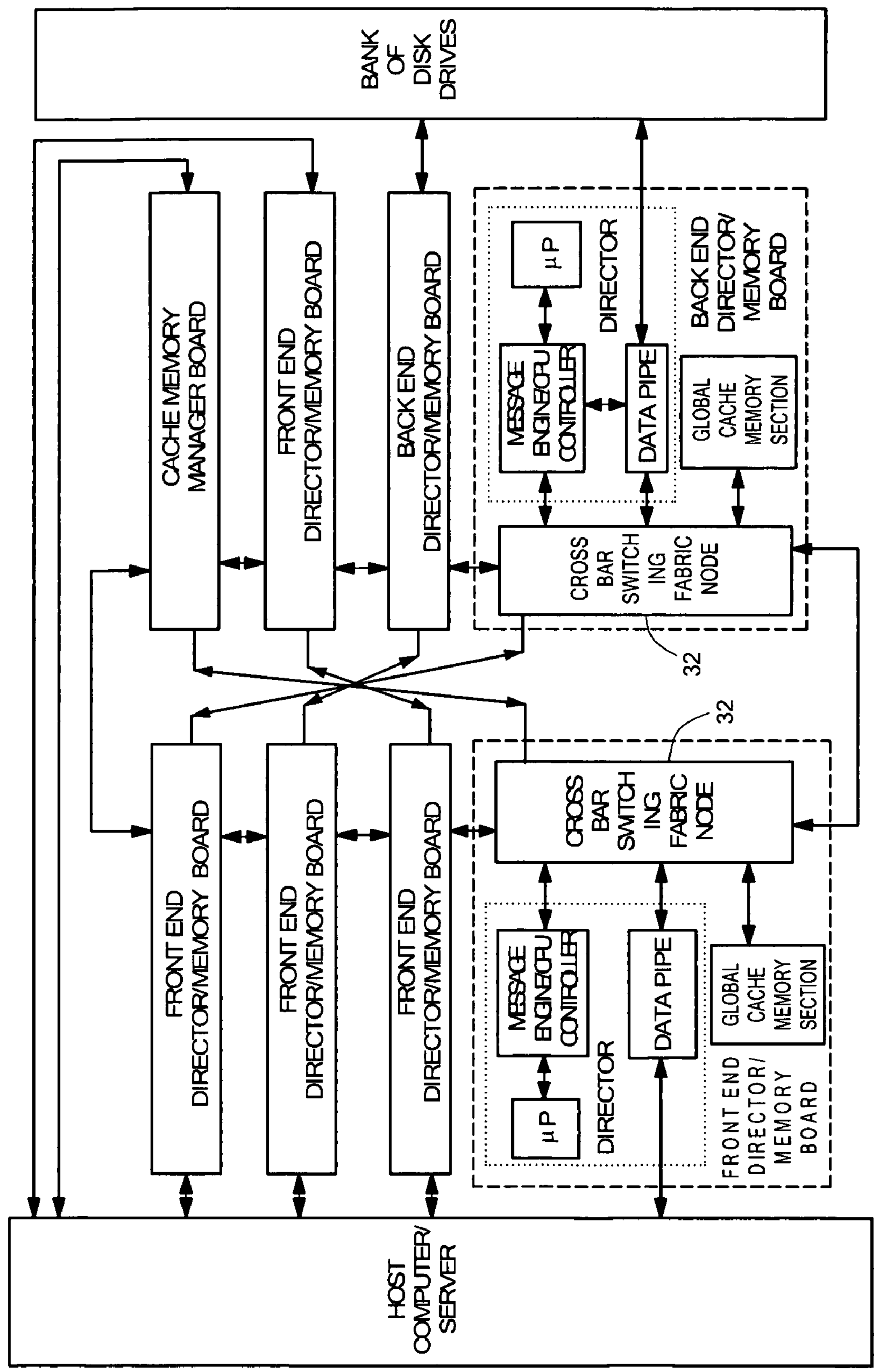
FIG. 16 is a block diagram of a data storage system according to yet another embodiment of the invention.

Referring now to FIG. 16, an unbalanced system is shown. That is, here there are six front end director/memory boards and one back end director/memory board and a cache memory manager boards. It follows that other arrangements are equivalent.

Figure 17:
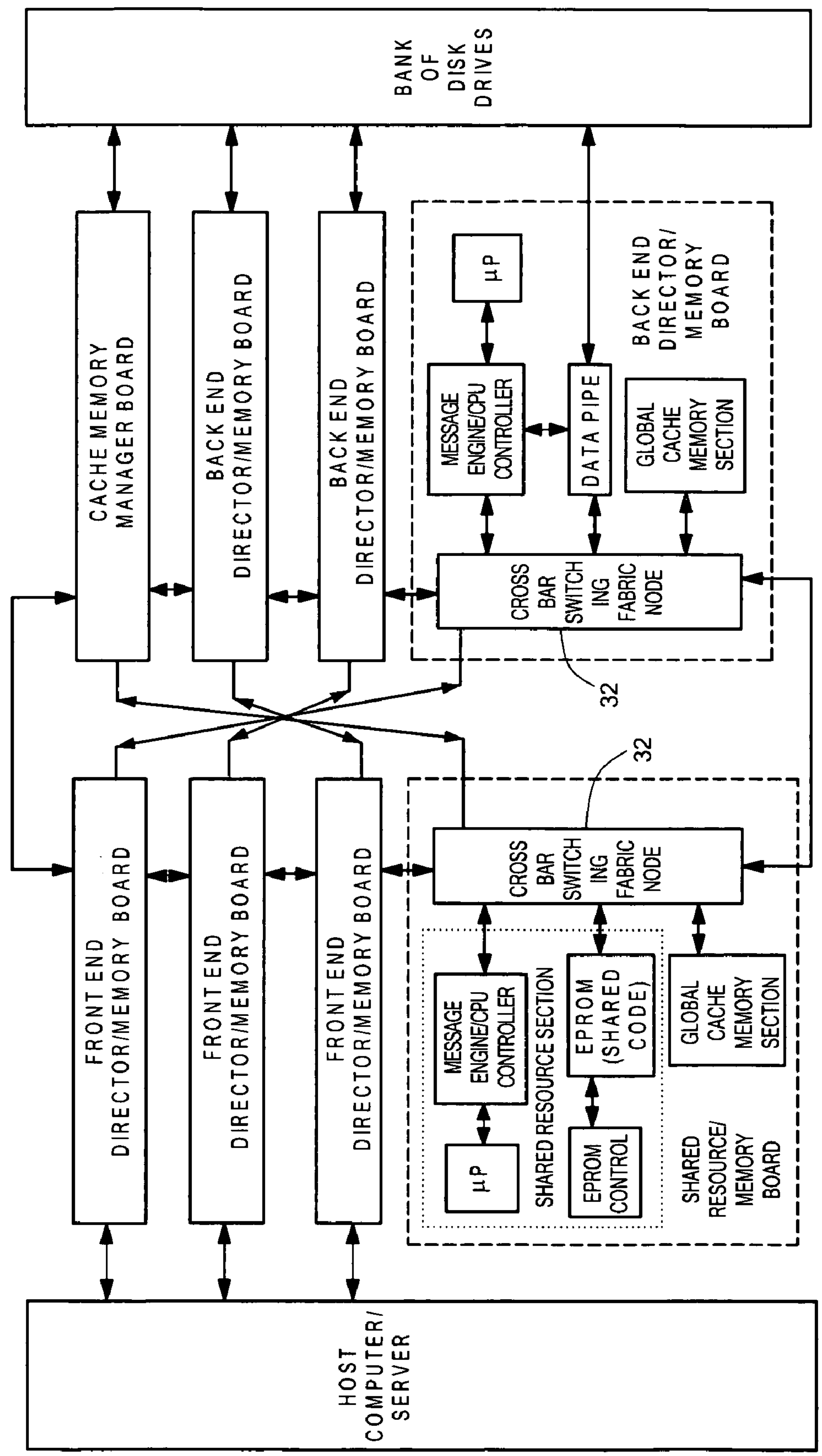
FIG. 17 is a block diagram of a data storage system according to yet another embodiment of the invention, here such system having a shared code storage section.

Referring now to FIG. 17, another embodiment is shown. Here, there are three front-end director/memory boards, three back end director/memory boards, a cache memory manager board and a shared resource board. The stored resource board includes a crossbar switch connected to the back, front end director/memory boards and cache memory manager board as described above in connection with FIG. 14. Here the crossbar switch of the code storage section/memory board is coupled to a global cache memory section and a shared code storage section. The shared resource board includes a shared resource section which includes a microprocessor and message engine/CPU controller described above, a memory, here an EPROM having stored therein computer code used by the front end and back end directors and an EPROM controller, arranged as shown. The shared resource section also includes a maintenance network connection accessible from sources and test equipment, not shown, external to the system interface. Such connection allows for updates in code which may now be shared by all directors. The shared resource section also enables reset (i.e. boot-up control) and creation of the routing table described above. These features are particularly useful as the system interface becomes updated. It also enables environmental monitoring of the system.

The EPROM stores shared resources (i.e., resources shared by the front end and back end directors) and other system resources. Such an arrangement allows for code updates through replacement of this shared code storage section/memory board. It should be understood that the board may be made without the shared memory section thereon. The code stored in the EPROM may include the boot-up code for the CPUs of the front end and back end directors, configuration data, emulation data code, diagnostic code. It is noted that the code in the EPROM can be transferred to the message engine/CPU controller and shared memory section on the shared code storage section/memory board via the crossbar switch on such shared code storage section/memory board.

It should be understood that the use of an EPROM is an example of one such device, used to hold code images that can be loaded by the various directors. Thus other devices include, for example, non-volatile RAM (NVRAM) for status and error logging, Time-of-Day clock, Enclosure management, Fabric initialization hardware and software, storage system and data storage management utilities, debug access ports and support, and global routing information.

Referring now to FIG. 18, another embodiment is shown. Here, there are three front end director/memory boards, two back end director/memory boards, a cache memory manager board and a pair of shared code storage section/memory boards. The second shared code storage section/memory board provides redundancy in the event that one of the pair of storage section/memory board fails.

Figure 19:
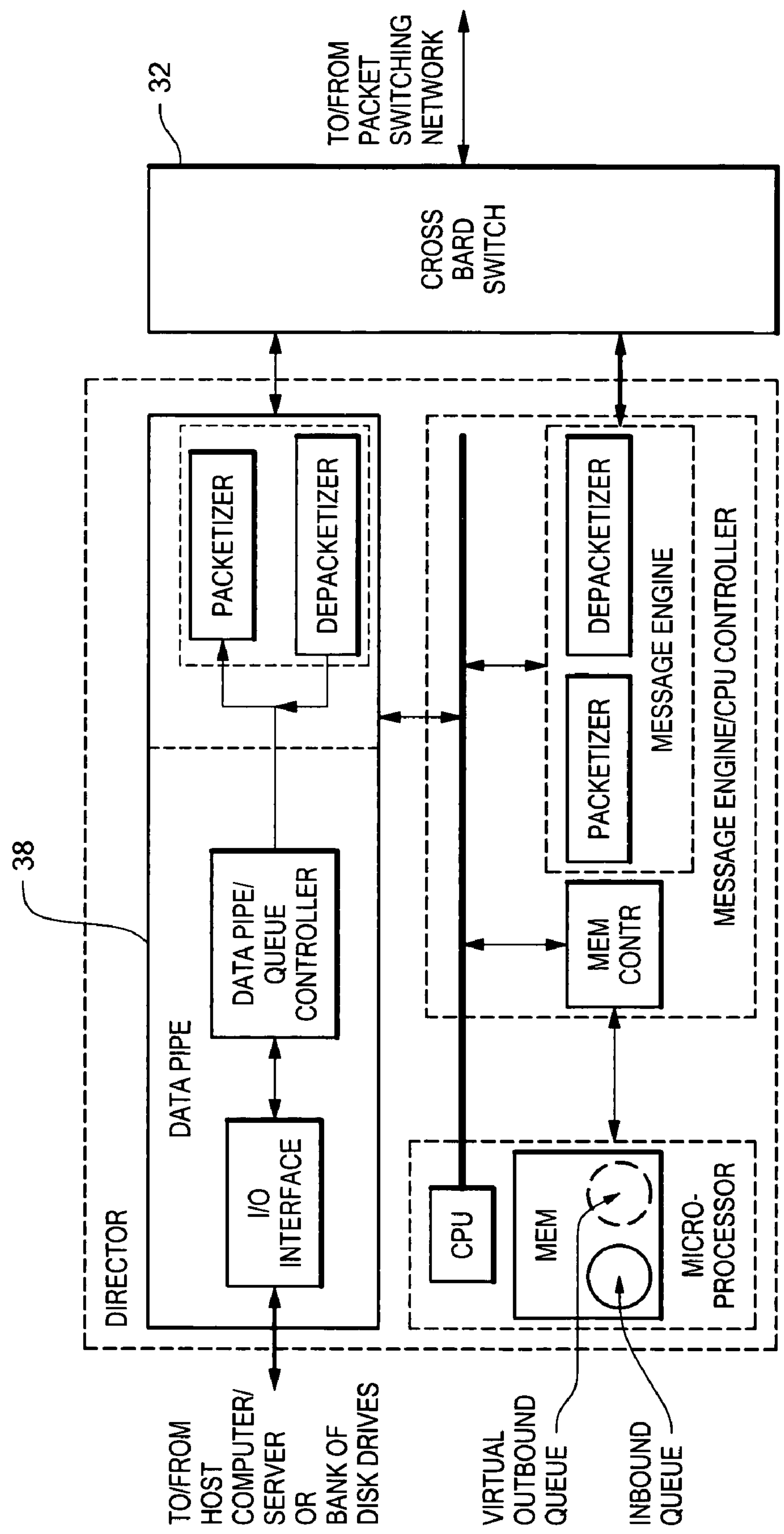
FIG. 19 is a block diagram of a data storage system having a shared code storage section according to yet another embodiment of the invention.

Referring now to FIG. 19, the director shown in FIG. 11 is shown in more detail. Thus, the data pipe 38 is shown to include an input/output (I/O) interface, a data pipe/Queue controller as well as the packetizer and depacketizer. Note that the data pipe/queue controller includes an I/O memory and a translation table to be described in more detail below. Suffice it to say here that the I/O interface memory does not include a section for an inbound queue for reasons to be described below. The queue for inbound messages are stored in the CPU memory of the director which is to execute the inbound message and hence a "virtual" queue is shown dotted in the I/O interface memory, it being understood that such memory does not store inbound messages producer or consumer indices.

The microprocessor memory (i.e., the CPU memory) is shown to include in a section thereof an inbound queue. It is noted that the microprocessor memory does not include a section for an outbound queue for reasons to be described below. The queue for outbound messages are stored in the I/O interface memory of the director which is to execute the inbound message and hence a "virtual" queue is shown dotted in the microprocessor memory, it being understood that such memory is not required to store outbound message's producer or consumer indices.

Figure 20:
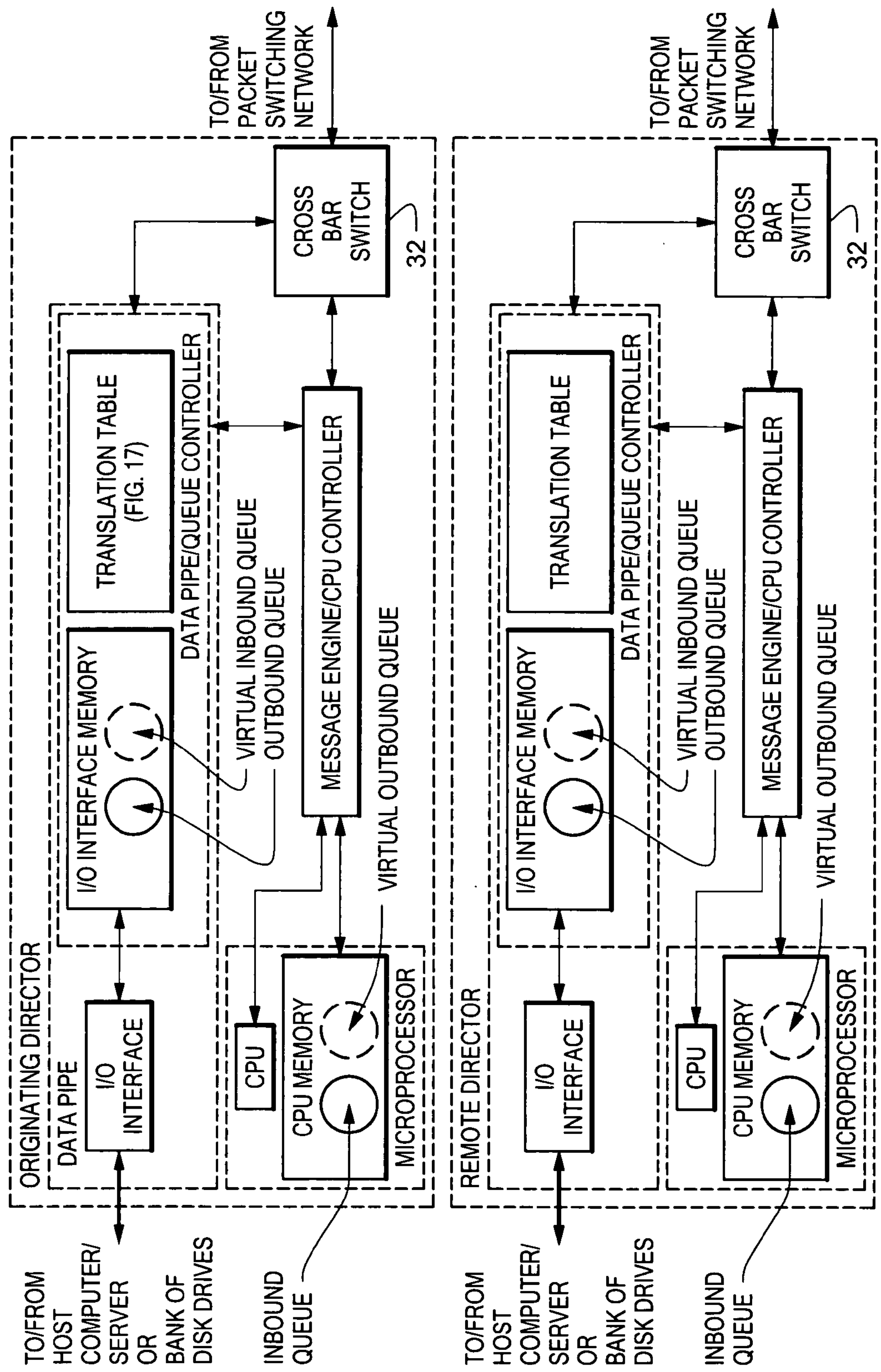
FIG. 20 is a more detailed block diagram of a pair of the directors shown in FIG. 9.

Referring now to FIG. 20, a pair of the directors is shown. Note that for purposes of describing the operation of the directors one of the pair of directors will be referred to as an originating director and the other the remote director.

Figure 21A:
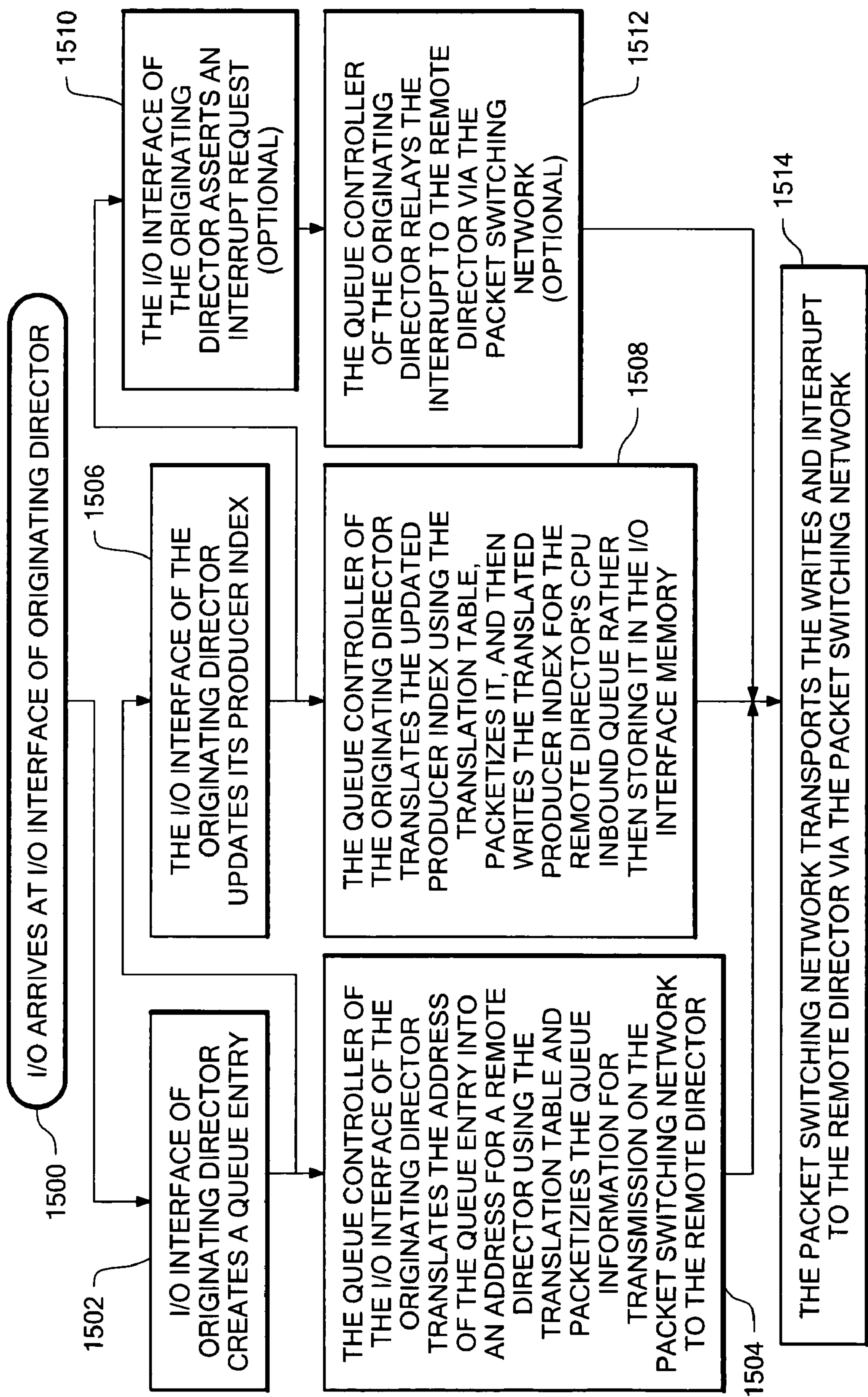
FIG. 21 is a flow diagram shows the processing of inbound information (i.e., messages) from an originating director of FIG. 20, to the remote director of FIG. 20.
Figure 21B:
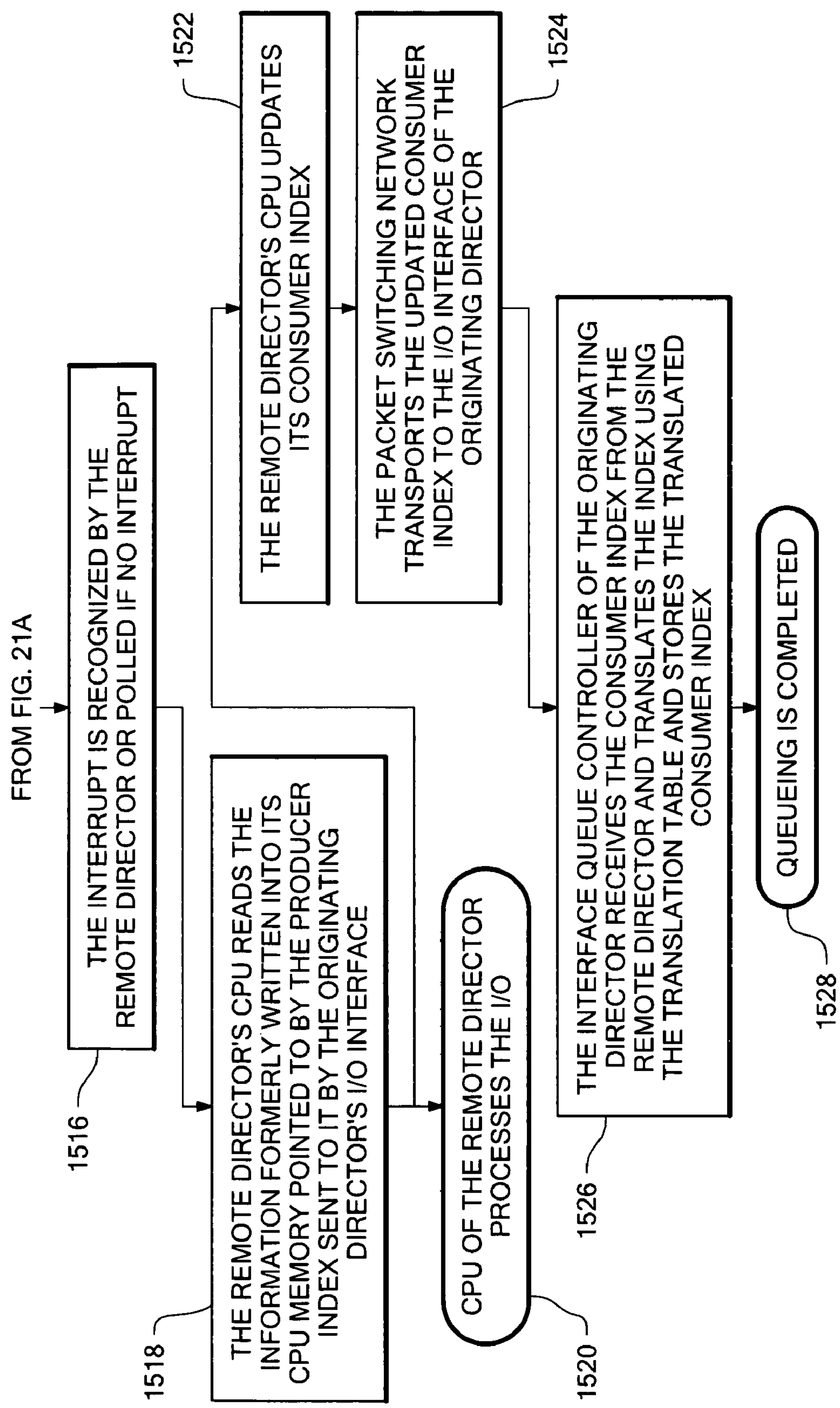
Figure 22A:
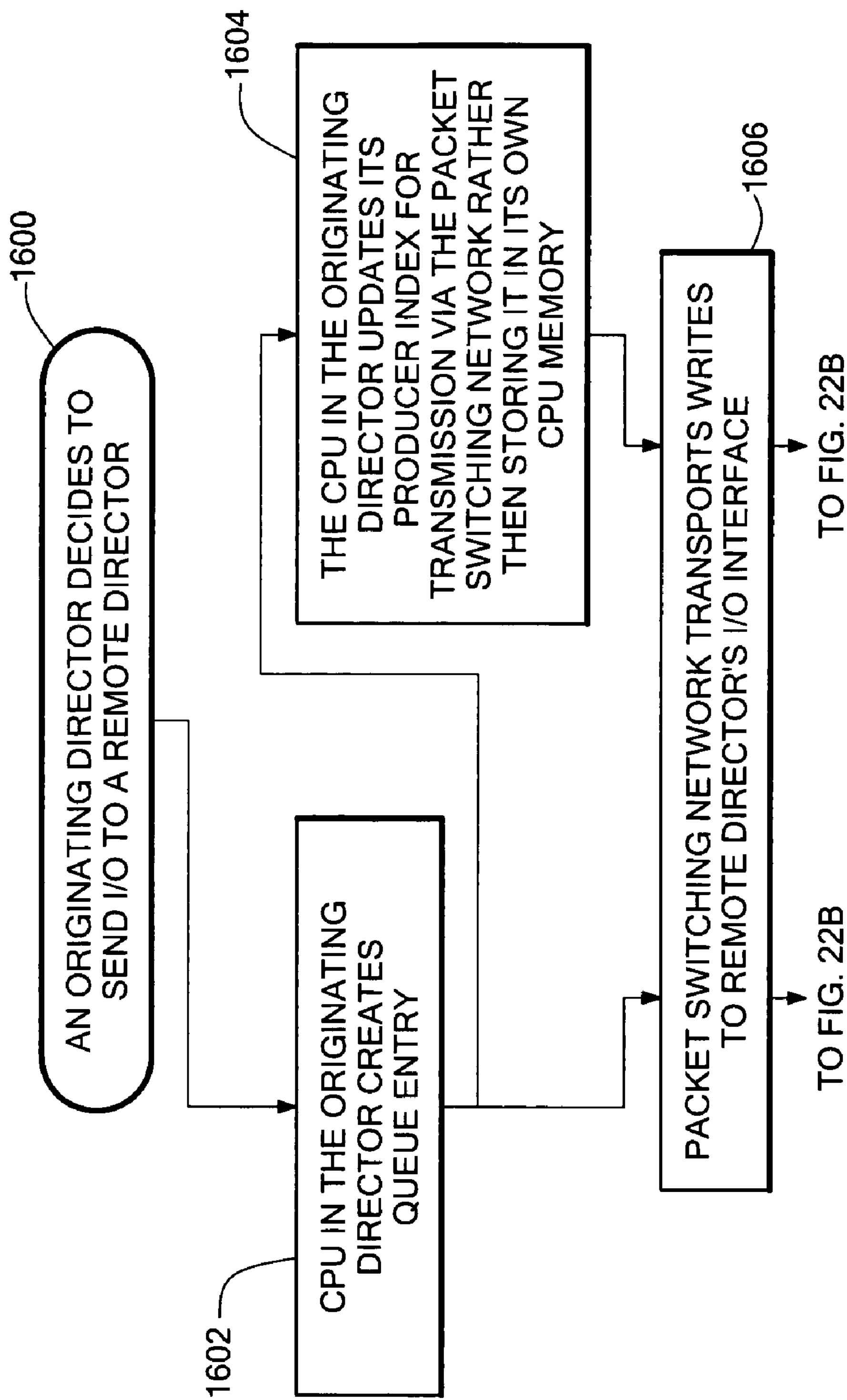
FIG. 22 is a flow diagram shows the processing of outbound information (i.e., messages) from the remote director of FIG. 14 to the originating director of FIG. 20.
Figure 22B:
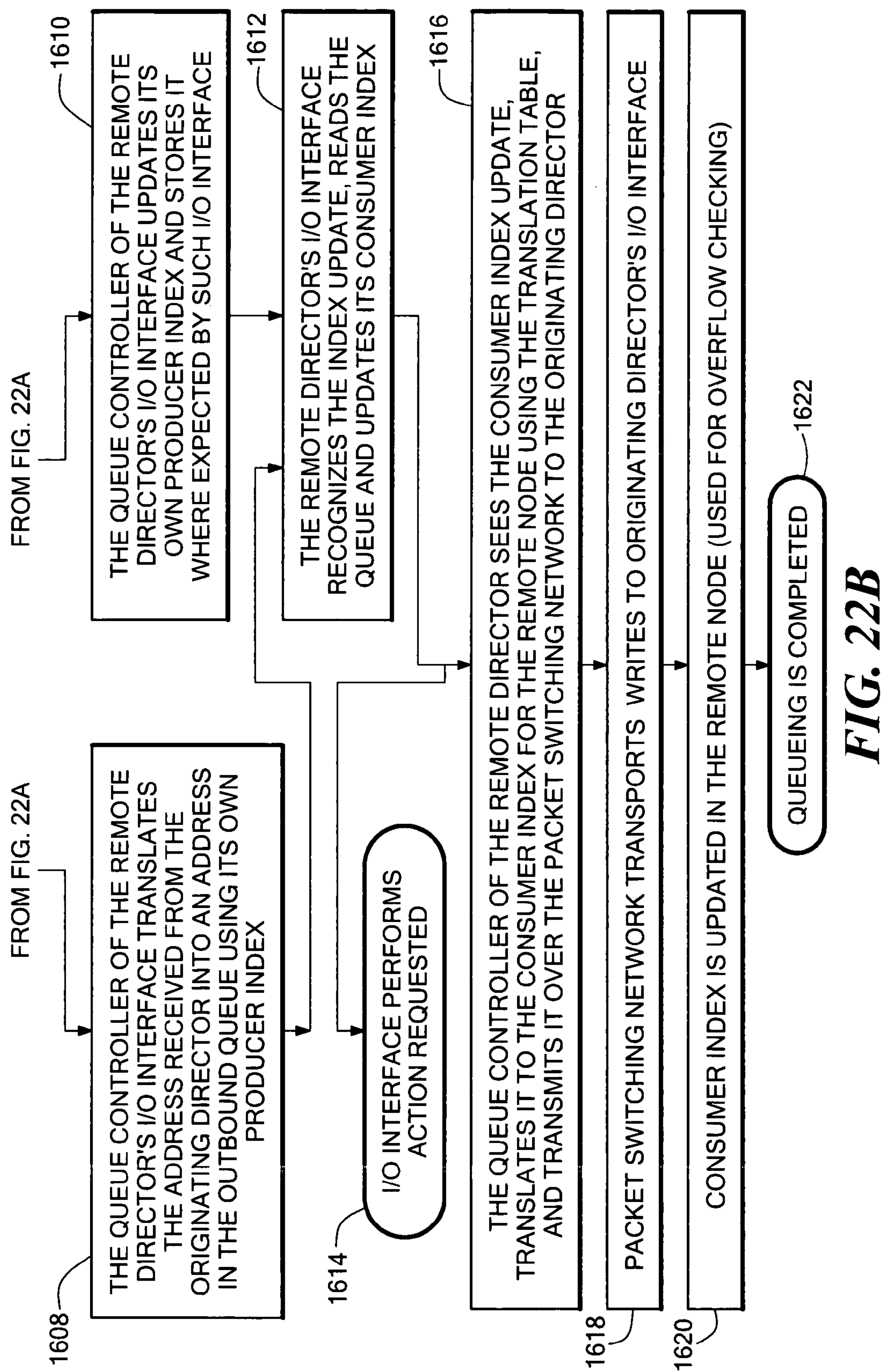

Referring also to FIGS. 21 and 22, FIG. 21 is a flow diagram shows the processing of inbound information (i.e., messages) from the originating director to the remote director and FIG. 16 is a flow diagram shows the processing of outbound information (i.e., messages) from the remote director to the originating director.

Thus, referring to FIG. 21, an I/O (i.e., information) arrives at the I/O interface of the originating director, Step 1500. The I/O interface of the originating director creates a queue entry, Step 1502. The queue controller of the I/O interface of the originating director translates the address of the queue entry into an address for a remote director using a translation table (FIG. 17) and packetizes the queue information for transmission on the packet switching network to the remote director, Step 1504. Also, the I/O interface of the originating director updates its producer index. Step 1506. The queue controller of the originating director translates the updated producer index using the translation table (FIG. 23), packetizes it, and then writes the translated producer index for the remote director's CPU memory's inbound queue rather than storing it in the I/O interface memory, Step 1508. Also, the I/O interface of the originating director asserts an interrupt request (optional). It is also checks that the producer index does not exceed the consumer index (i.e., an overflow condition).

Step 1510. The queue controller of the originating director relays the interrupt to the remote director via the packet switching network (optional), Step 1512.

The packet switching network transports the writes and interrupt to the remote director via the packet switching network, Step 1514.

The interrupt is recognized by the remote director or the producer index is polled if there is no interrupt, Step 1516.

The remote director's CPU reads the information formerly written into it's CPU memory pointed to by the producer index sent to it by the originating director's queue controller. Step 1518. The CPU of the remote director processes the I/O, Step 1520. Also, the remote director's CPU updates its consumer index, Step 1522. The packet switching network transports the updated consumer index to the I/O interface of the originating director, Step 1524. The interface queue controller of the originating director receives the consumer index from the remote director and translates the index using the translation table and stores the translated consumer index, Step 1526. The inbound queuing is completed, Step 1528.

Thus, referring to FIG. 22, an originating director decides to send an I/O to a remote director, Step 1600. The CPU in the originating director creates a queue entry, Step 1602. Also, the CPU in the originating director updates its producer index for transmission via the packet switching network rather than storing it in its own CPU memory, Step 1604.

The packet switching network transports writes to the remote director's I/O interface, Step 1606.

The queue controller of the remote director's I/O interface translates the address received from the originating director into an address in the outbound queue using it's own producer index, Step 1608. The queue controller of the remote director's I/O interface updates its own producer index and stores it where expected by such I/O interface, Step 1610. The remote director's I/O interface recognizes the index update, reads the queue and updates its consumer index, Step 1612. The I/O interface performs the action required, Step 1614. Also, the queue controller of the remote director sees the consumer index update, translates it to the consumer index for the remote director using the translation table (FIG. 23) and transmits it over the packet switching network to the originating director, Step 1616. The packet switching network transports writes to the originating director's I/O interface, Step 1618. The consumer index is updated in the remote director (used for overflow control), Step 1620. Outbound queuing is completed, Step 1622.

Referring now to FIG. 23, the translation table is shown. The address for the table, f(x), is a function that takes some part of the information in the queue entry and derives an address into the table from it. For example, in the queue entry, there may be a transaction ID, a host address, a logical device number, or some field that groups queue entries into some logical order. In other cases, the function could simply be a counter, taking each entry to the next in the translation table. The "Misc. Remote Info" may contain other information needed to access the remote node, such as security keys, queue length, task divisioning, table checksums and validity notes, preferences for interrupt, and "scoreboard", for example.

In addition to this table, two registers are maintained: "Local Producer Index{, and" Local Consumer Index: These indices (or pointers) are the ones that the I/O Interface sees and operates with. There can be multiple queues in either direction; therefore, the "Remote Producer Index" entry in the translation table could be actually two indices representing two separate queues with this one translation table. If the address offset is the same as the Remote CPU Number, then no field in the table is required. In some cases, a Remote Producer Index is not required. If the I/O Interface does not supply a Producer Index, the Translation Table is a mechanism for synthesizing one. The update of the Remote Producer Index can be programmed to produce an interrupt to the Remote CPU even if the local I/O Interface does not generate one, A number of embodiments of the invention have been described. Nevertheless, it will be understood that various modifications may be made without departing from the spirit and scope of the invention. Accordingly, other embodiments are within the scope of the following claims.

What is claimed is:

1. A system interface comprising:

a plurality of front end directors adapted for coupling to a host computer/server;

a plurality of back end directors adapted for coupling to a bank of disk drives;

a data transfer section having cache memory, the cache memory being coupled to the plurality of front end and back end directors;

wherein the front end and back end directors control data transfer between the host computer/server and the bank of disk drives, such data passes through the cache memory in the data transfer section as such data passes between the host computer and the bank of disk drives;

a cache memory manager, adapted to receive queries from the plurality of directors, such cache memory manager having therein a memory for storing a map maintaining a relationship between data stored in the cache memory and data stored in the disk drives;

wherein the cache memory manager receives the queries from the plurality of directors and operates independently of the plurality of directors in processing such queries to determine for the querying directors whether data to be read from the disk drives, or data to be written to the disk drives, resides in the cache memory;

a packet switching network; and wherein the cache memory manager, plurality of front end directors, plurality of back end directors and cache memory are interconnected through the packet switching network.

2. The system recited in claim 1 wherein the cache memory manager is disposed in at least one of the back end directors.

3. The system recited in claim 1 wherein the memory in the cache memory manager has a plurality of, n, locations, each one of the locations corresponding to a location in the disk drives, each one of the locations in the memory in the cache memory manager being adapted to store therein a disk address and an indication as to whether data stored or to be stored in such disk location is in the cache memory.

4. The system recited in claim 3 wherein the logical disk address provided by the host computer/server is hashed and the memory in the cache memory manager comprises a plurality of, m, tables, each one of such m tables has a plurality, $n_m$, locations where the sum of the locations of the m tables equals n.

5. The system recited in claim 4 wherein, the cache memory manager, in response to a query of the memory therein provides an indication as to whether data stored or to be stored in such disk location is in the cache memory, and the hashed logical disk address provided by the host computer/server is fed to address one of the m tables in the cache memory manager.

6. The system recited in claim 1 wherein the system interface includes a message network, such message network operating independently of the data transfer section and being coupled to the plurality of the front end and back end directors for controlling data transfer between the host computer/server and the bank of disk drives in response to messages passing between the front end directors and the back end directors through the messaging network to facilitate data transfer between host computer/server and the bank of disk drives, such data passing through the cache memory in the data transfer section as such data passes between the host computer and the bank of disk drives.

* * * * *